Sept. 19, 1961 C. B. NOONAN 3,000,023
MACHINES FOR SHAPING UPPERS OVER LASTS
Filed April 28, 1959 20 Sheets-Sheet 1

Inventor
Charles B. Noonan
By his Attorney
Carl E. Johnson.

Sept. 19, 1961 C. B. NOONAN 3,000,023
MACHINES FOR SHAPING UPPERS OVER LASTS
Filed April 28, 1959 20 Sheets-Sheet 3
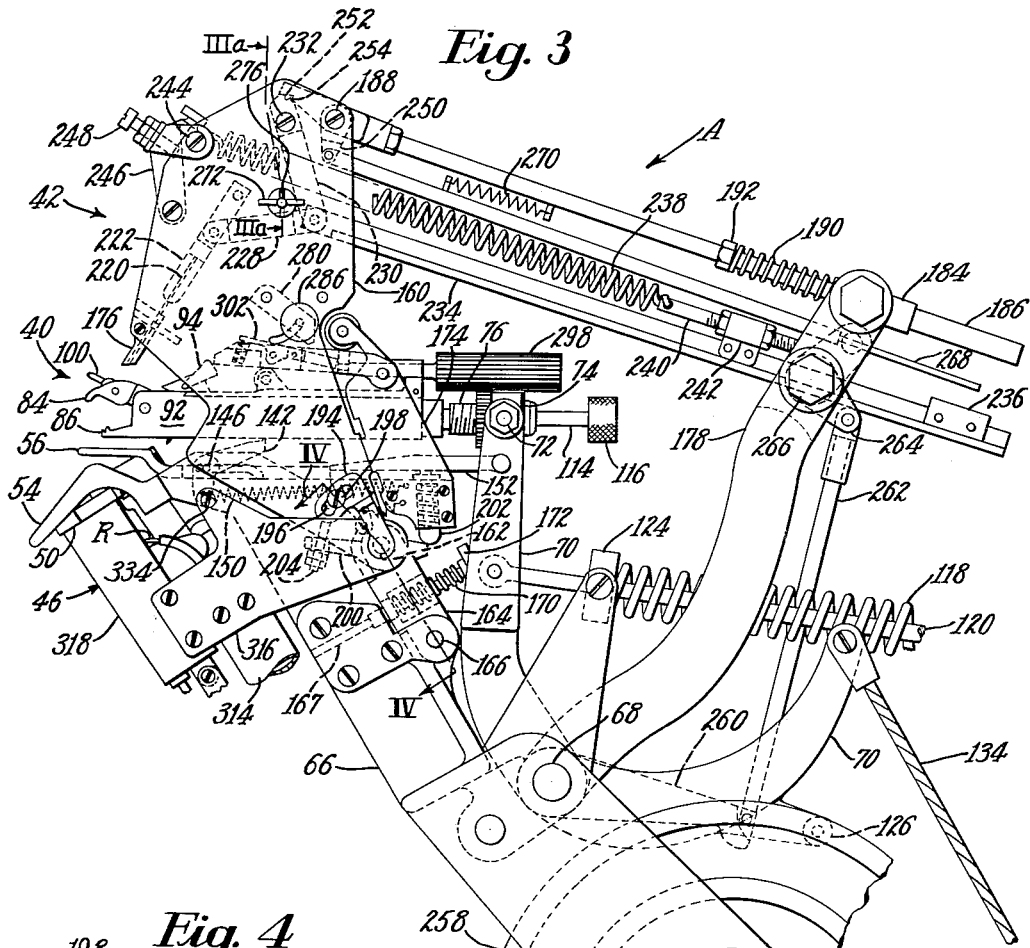
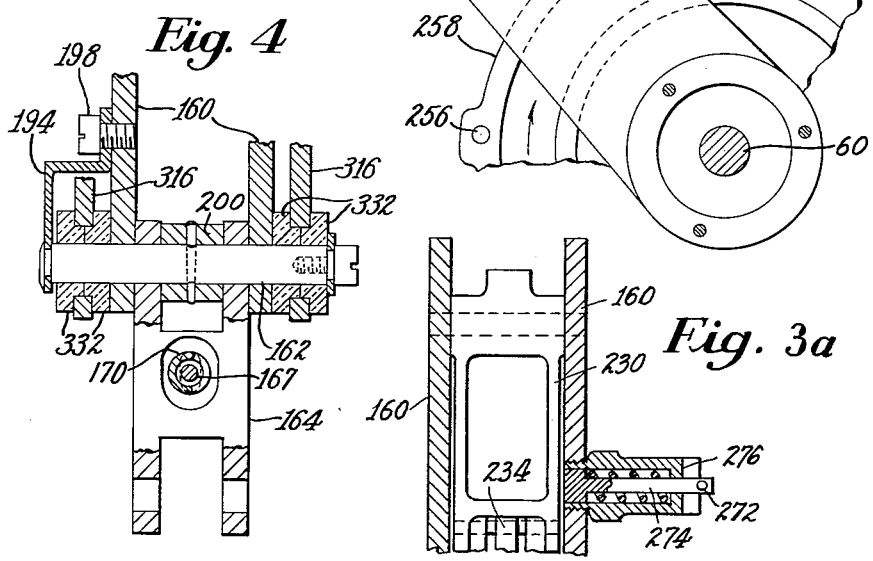

Sept. 19, 1961  C. B. NOONAN  3,000,023
MACHINES FOR SHAPING UPPERS OVER LASTS
Filed April 28, 1959  20 Sheets-Sheet 4
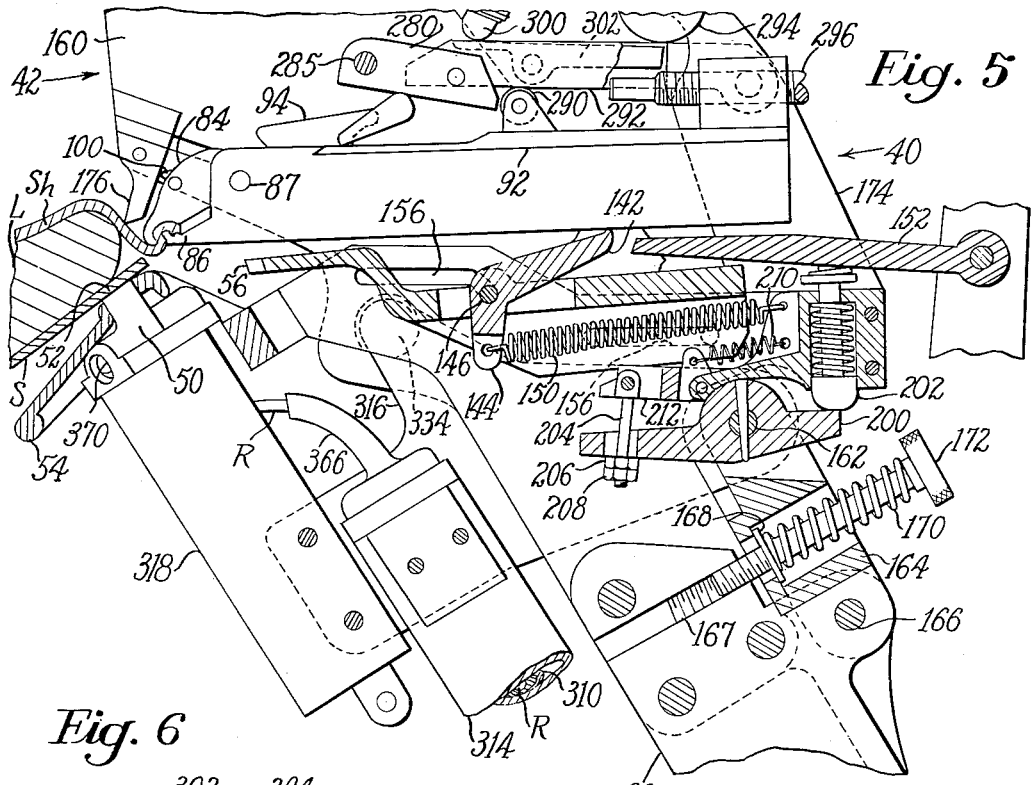
Fig. 5
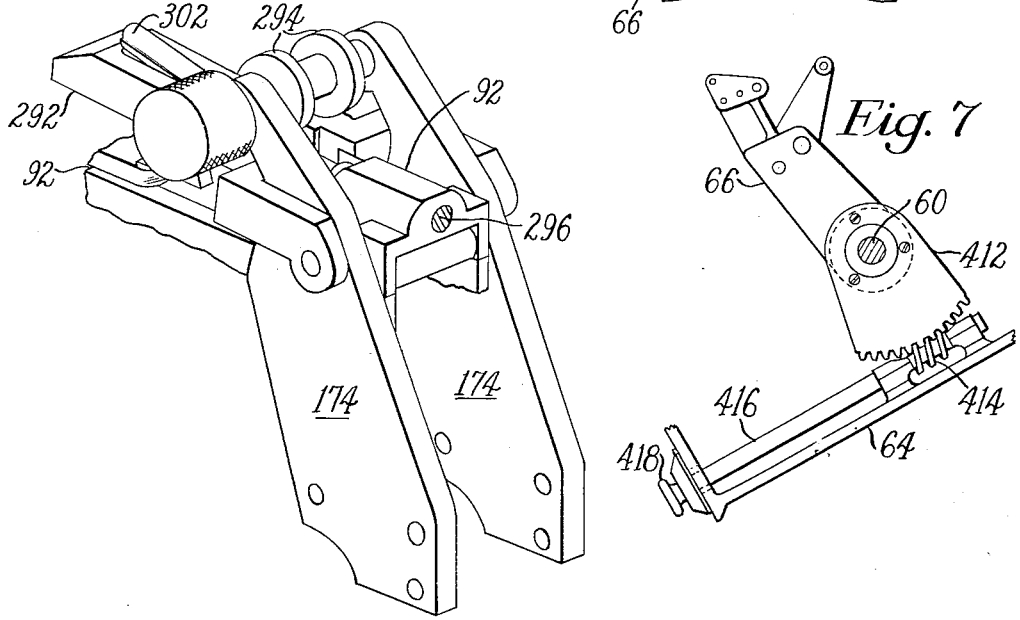
Fig. 6
Fig. 7

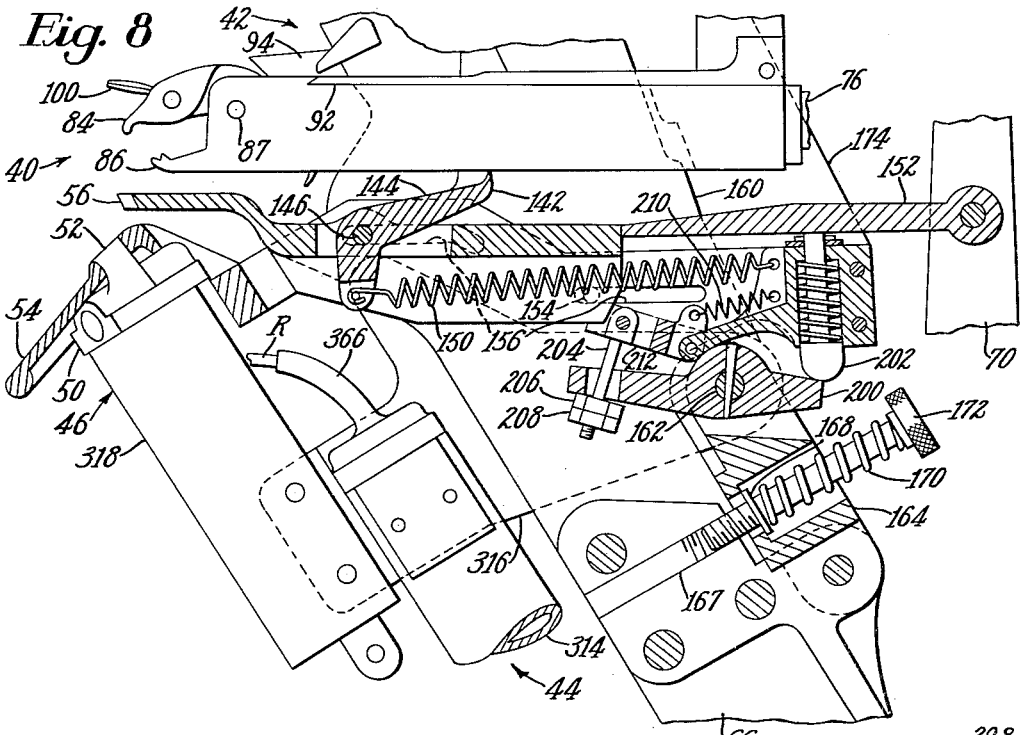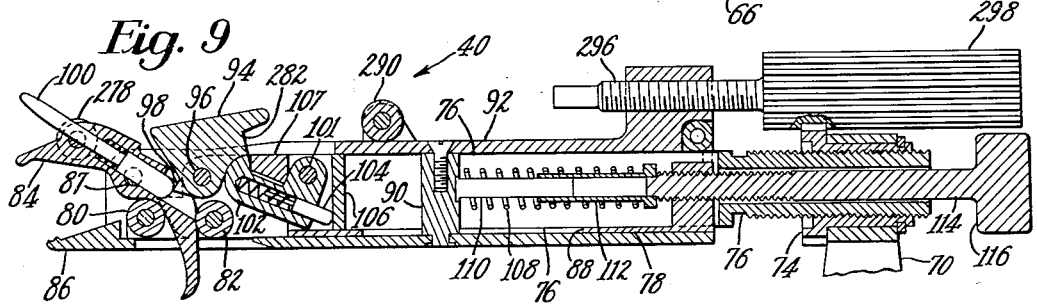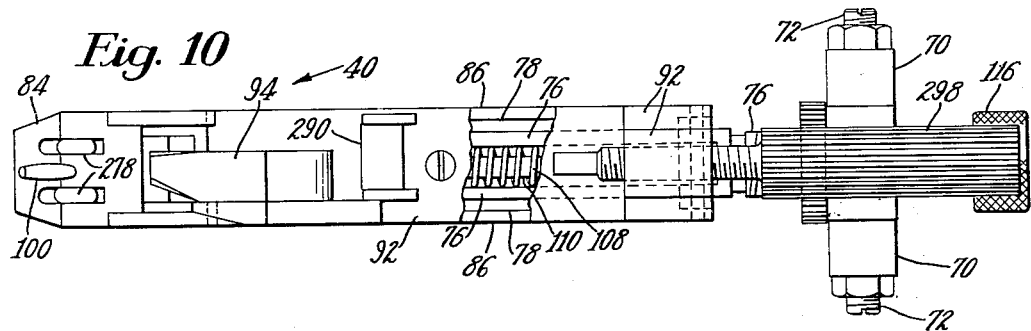

Sept. 19, 1961  C. B. NOONAN  3,000,023
MACHINES FOR SHAPING UPPERS OVER LASTS
Filed April 28, 1959  20 Sheets-Sheet 6

Sept. 19, 1961 C. B. NOONAN 3,000,023
MACHINES FOR SHAPING UPPERS OVER LASTS
Filed April 28, 1959 20 Sheets-Sheet 7

Sept. 19, 1961  C. B. NOONAN  3,000,023
MACHINES FOR SHAPING UPPERS OVER LASTS
Filed April 28, 1959  20 Sheets-Sheet 9

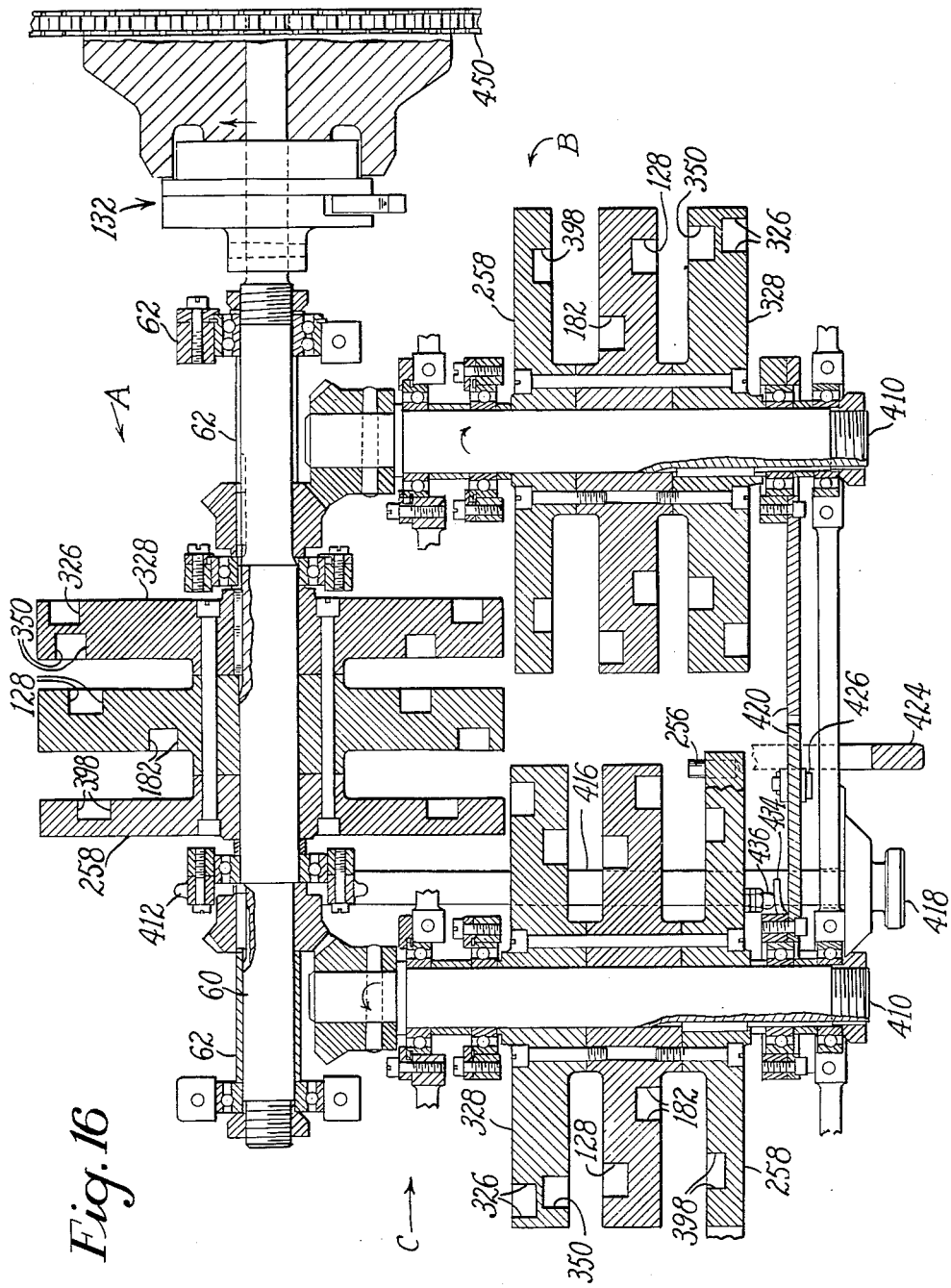

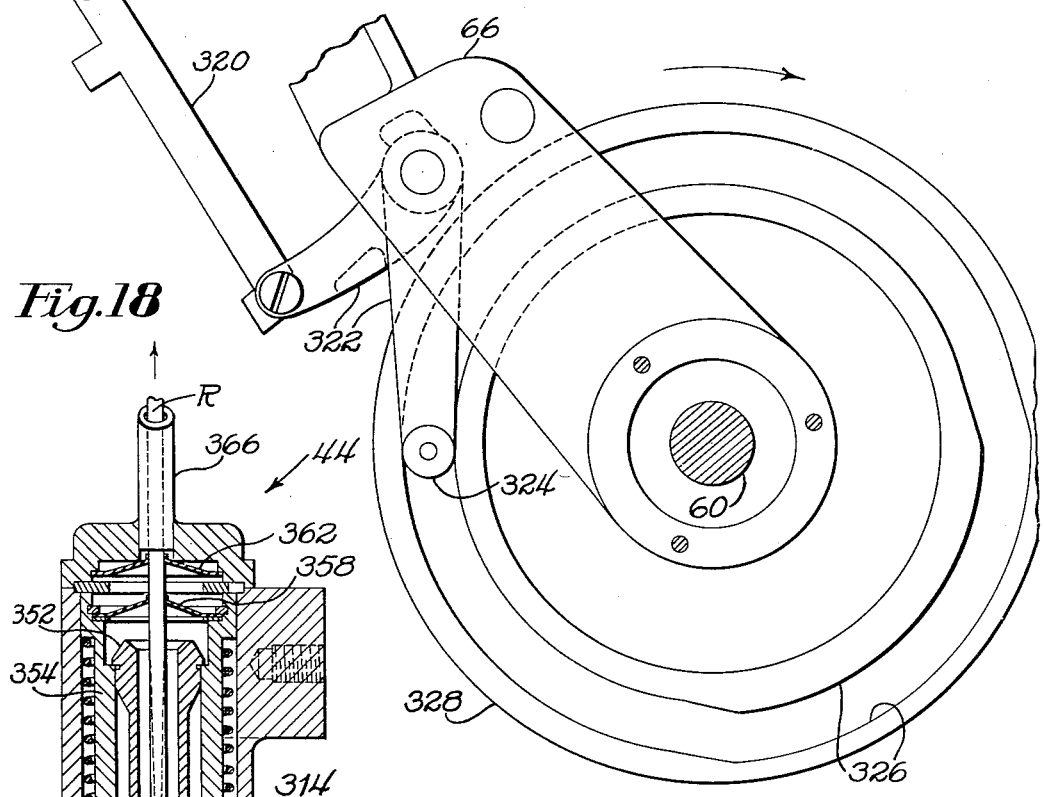

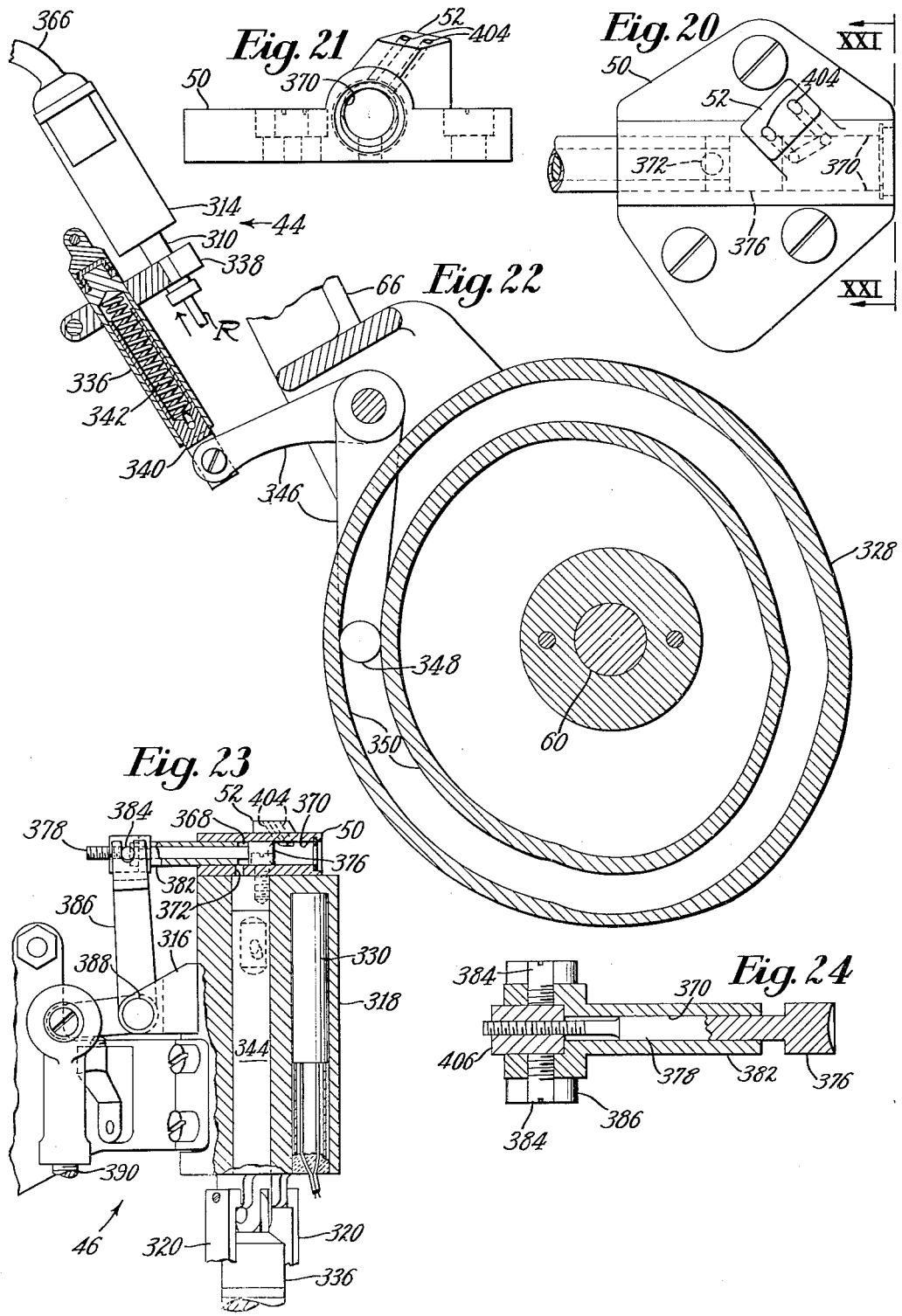

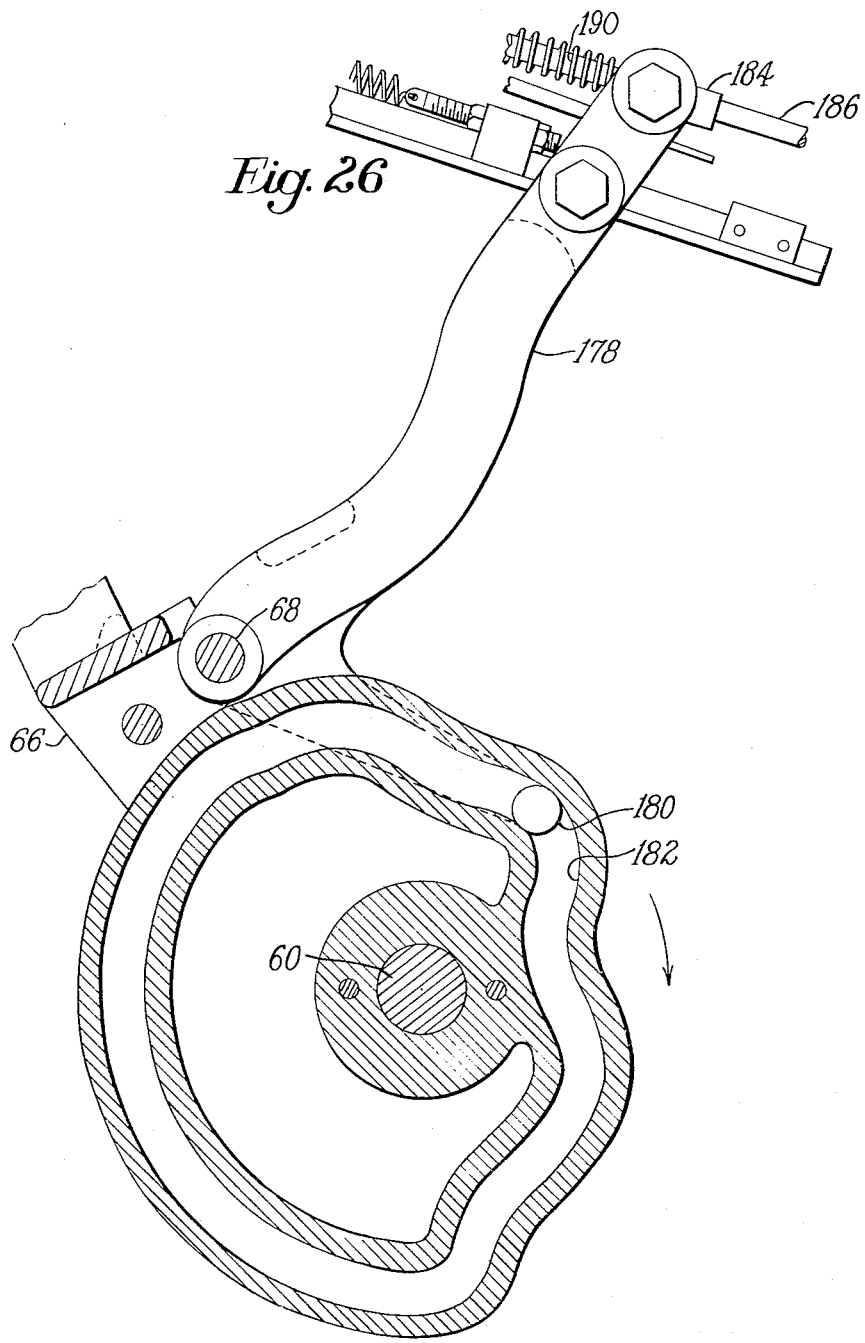

Sept. 19, 1961 C. B. NOONAN 3,000,023
MACHINES FOR SHAPING UPPERS OVER LASTS
Filed April 28, 1959 20 Sheets-Sheet 15
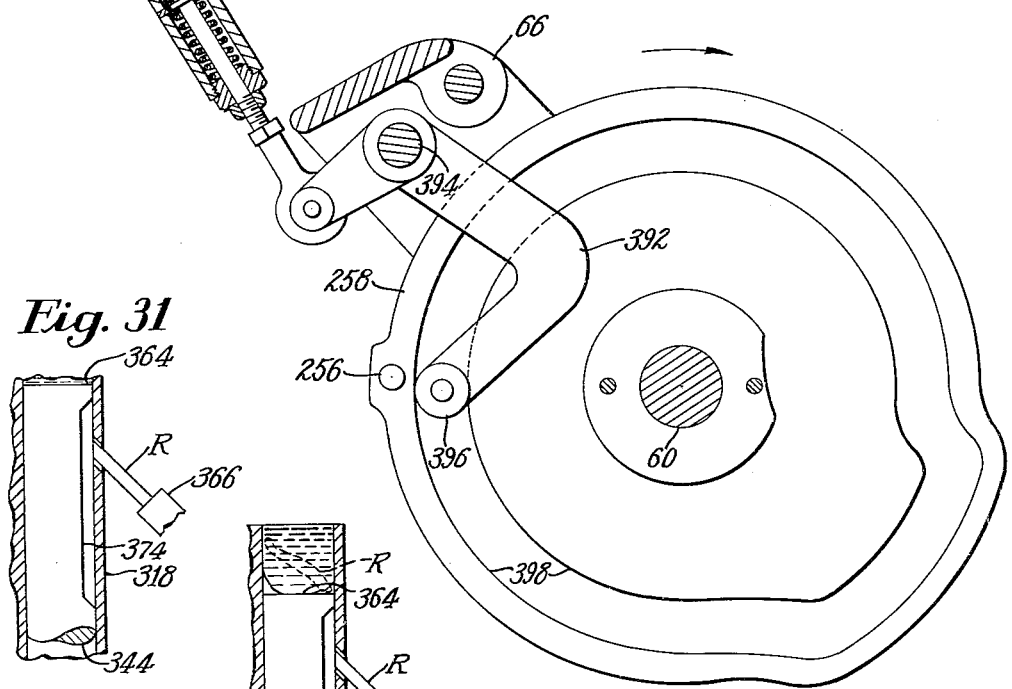

Sept. 19, 1961 C. B. NOONAN 3,000,023
MACHINES FOR SHAPING UPPERS OVER LASTS
Filed April 28, 1959 20 Sheets-Sheet 16
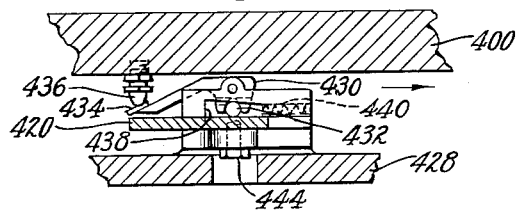
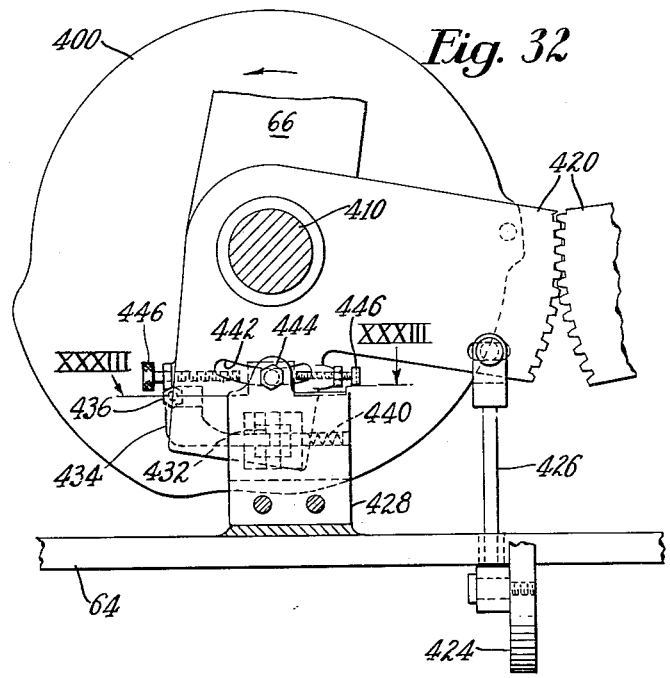

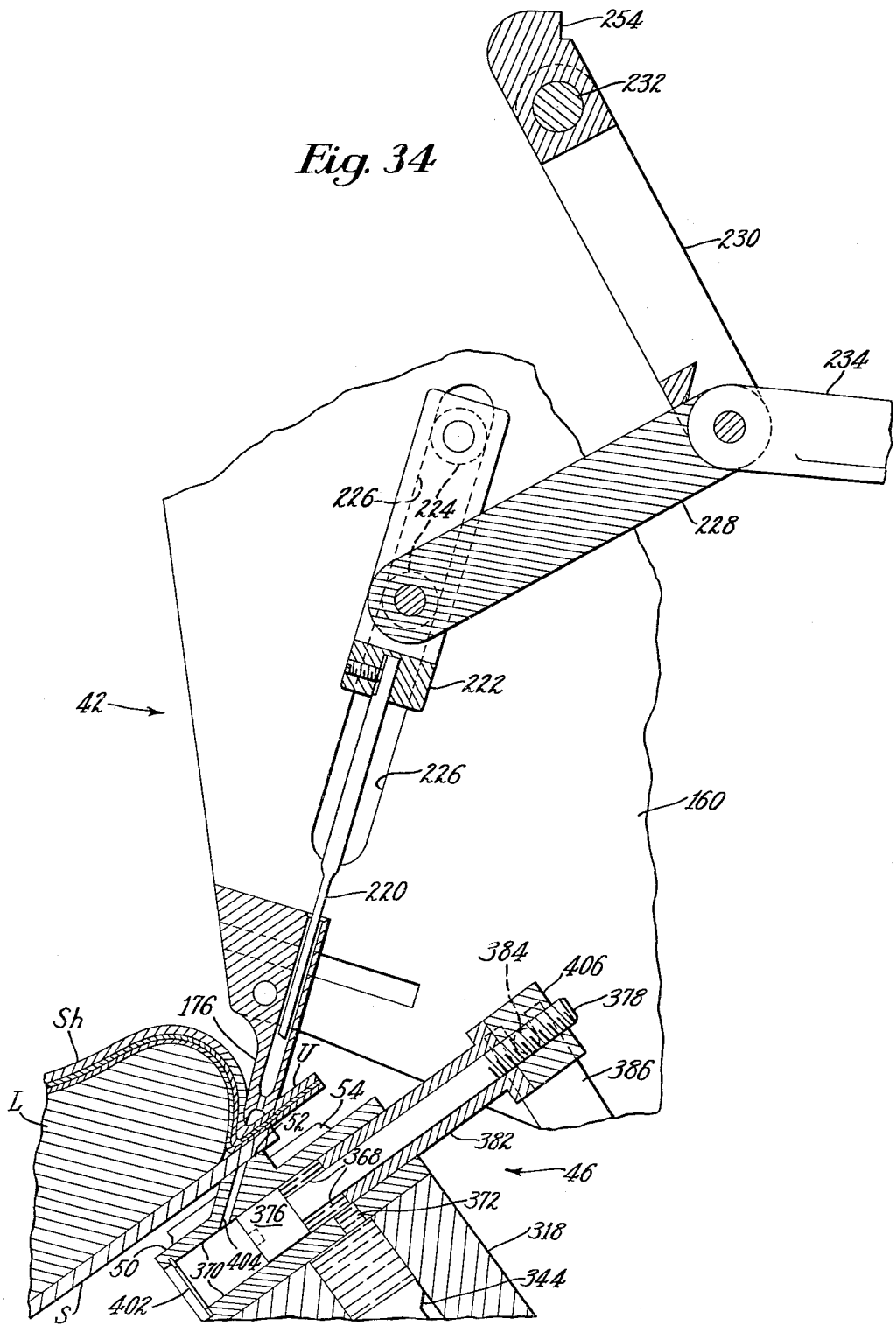

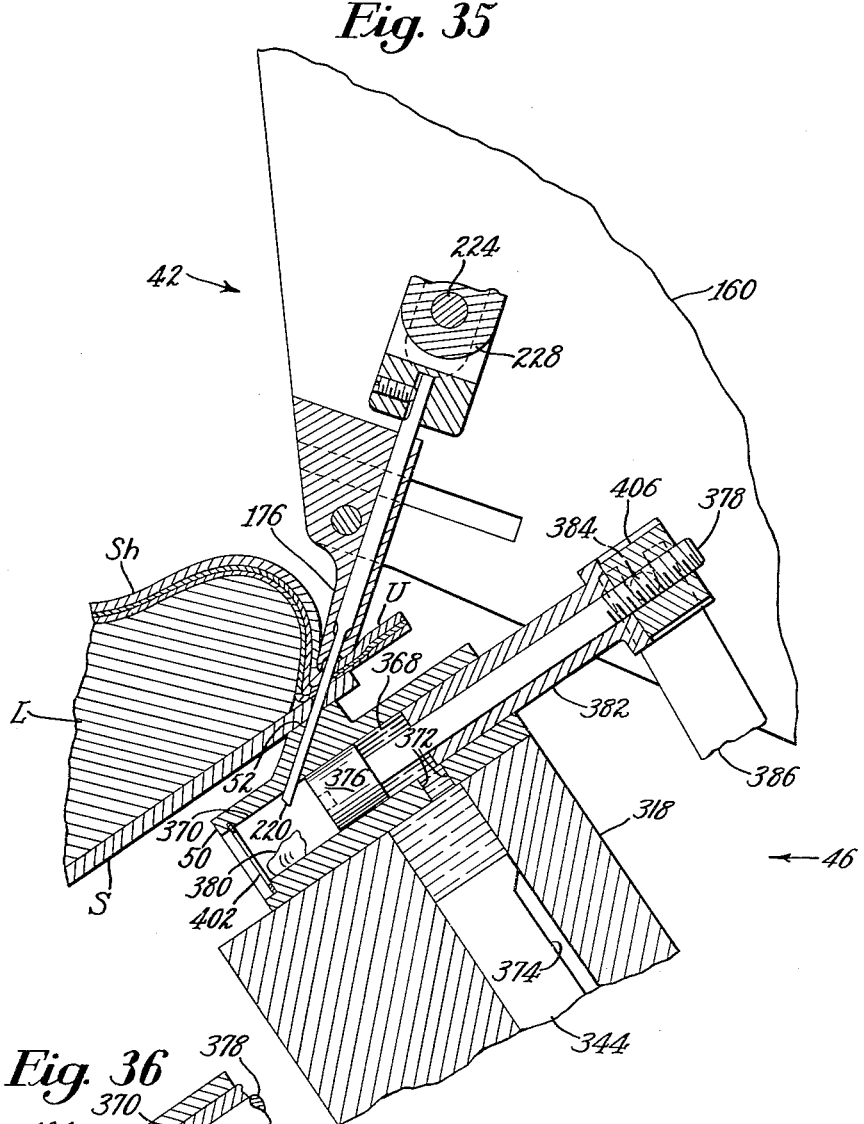
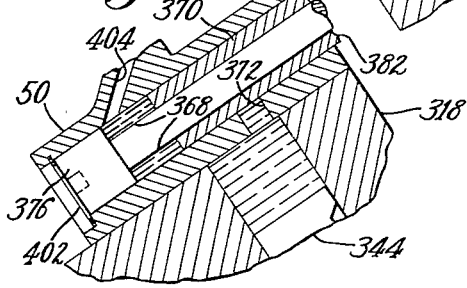

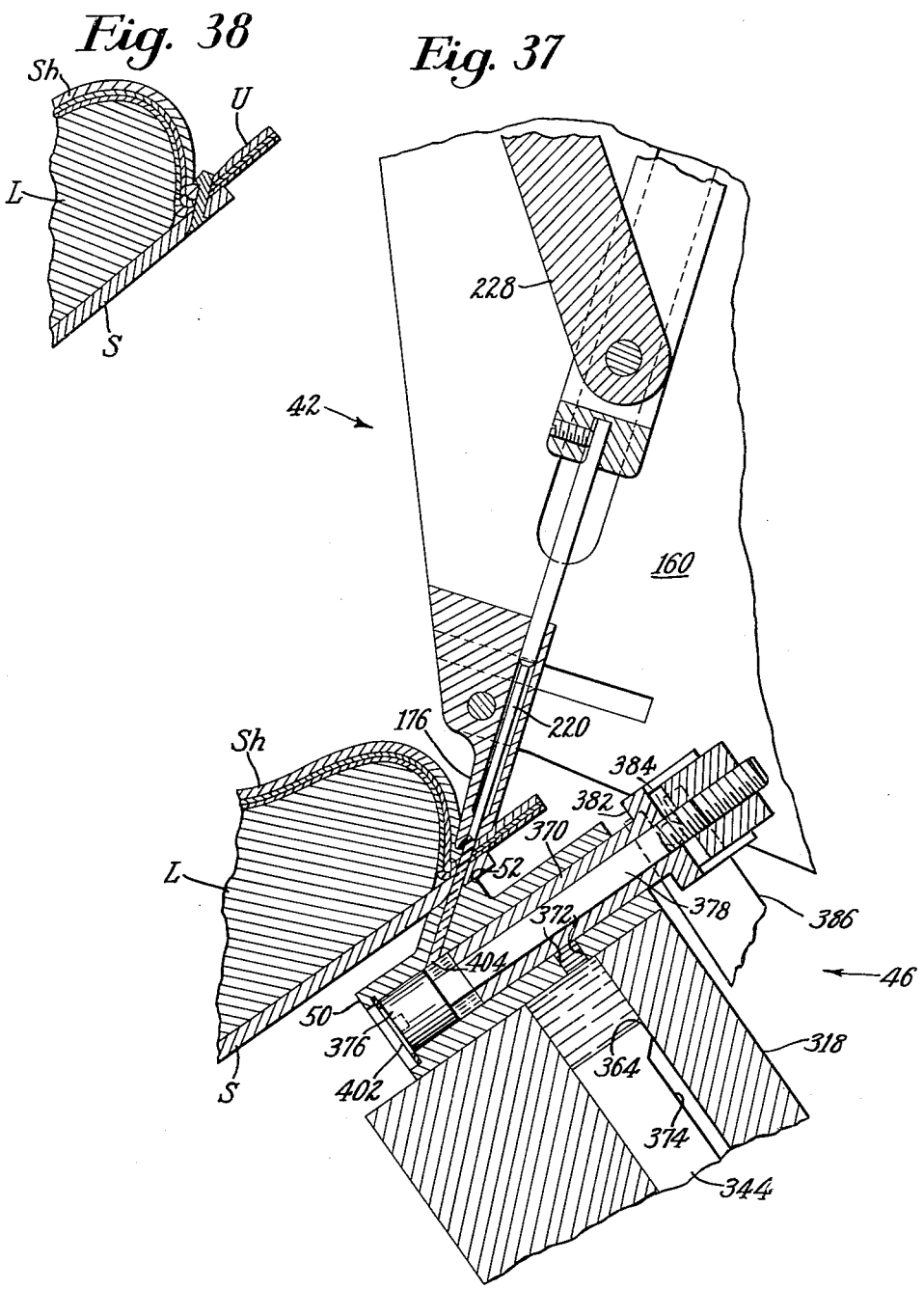

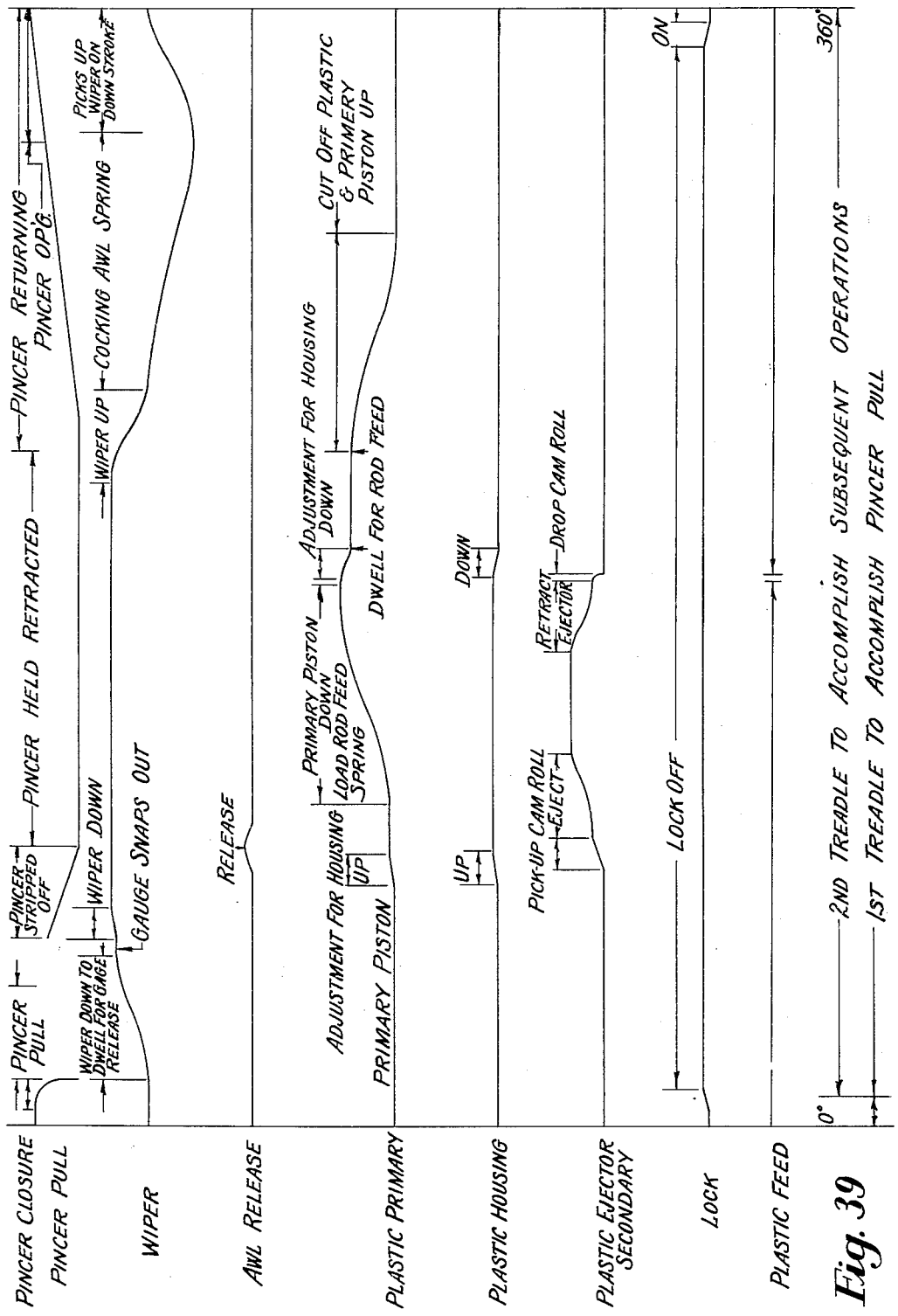

United States Patent Office 3,000,023
Patented Sept. 19, 1961

3,000,023
MACHINES FOR SHAPING UPPERS OVER LASTS
Charles B. Noonan, Vassalboro, Maine, assignor to United Shoe Machinery Corporation, Flemington, N.J., a corporation of New Jersey
Filed Apr. 28, 1959, Ser. No. 809,433
13 Claims. (Cl. 12—7.6)

This invention relates to machines for shaping uppers over lasts, and more especially to machines for performing a pulling over operation in preparation for toe lasting. As herein illustrated, the invention is embodied in a machine for pulling over the uppers of stitchdown shoes, the tensioned uppers being attached to an extension sole by plastic fastenings formed in the machine and inserted through the upper and the extension sole at the bottom lines of the lasts. It will be appreciated that in its various novel aspects the invention is not thus limited, but may well have application in other lasting machines and shoemaking machinery.

A primary object of this invention is to provide an improved pulling over machine wherein, after grippers have operated to tension an upper heightwise and somewhat away from a last bottom at the toe end and at each side at the tip line, a wiper draws upper material through the gripper jaws as required to wipe the upper into the angle between the last and the sole thereon, and as the wiper then holds the upper stock in lasted position, novel means cooperative with the wiper is automatically operative to secure the tensioned upper to the sole by the application of thermoplastic fastener material. For the purpose in view, the invention is illustrated in the drawings as embodied in a machine of the "inverted" type in which the grippers are arranged to exert a downward pull on the upper of a shoe on a last presented manually with its toe end uppermost and inclined rearwardly away from the operator. The machine is equipped with three essentially similar operating assemblies, one of which is arranged to operate at the extremity of the toe and the other two at opposite ends of the tip line. In order to advance and retract the operating units toward and away from opposite ends of the tip line, the side units are geared together for equal and opposite angular movement. A gage member in the operating unit at the extremity of the toe serves to position the last longitudinally relatively to the operating instrumentalities, and each of said side units carries a gage member arranged to contact the periphery of the last, these two side gage members thus cooperating to center the toe portion of the last relatively to the operating instrumentalities. Each of the three operaing units is mounted for swinging movement toward and from a shoe in the machine on its respective cam shaft extending below the operating station, the operations of the pincers, the wipers, and the plastic injecting assemblies being automatically effected in sequence by a treadle movement which operates a clutch to control the three cam shafts.

As is common in pulling over machines, upon the completion of the initial upper tensioning operation the machine stops to permit adjustment of the upper widthwise and lengthwise of the last by means of hand levers. As herein shown, in the course of thereafter wiping the upper downwardly and into the angle between the side of the last and the extension of the sole, the three gage members above referred to are retracted by springs rendered operable by the automatic release of three latches incorporated in the three wiper units, respectively. During the further operation of the wipers, springs causing the grippers to apply tension to the upper yield to permit the grippers to move bodily toward the shoe. In accordance with a further feature of the invention, if the upper stock is slightly scant, the grippers will be advanced (due to operation of the wipers) to a point where a plunger in each gripper assembly is struck by a portion of the wiper assembly and hence actuates mechanism for reducing the gripping force of the grippers to permit the margin of the upper to be slightly relaxed by sliding between the jaws as the wipers advance.

Upon completion of the wiping operation an awl in each of the wiper units is operated by a toggle to punch a hole through the margins of the upper and the insole, the toggle going beyond dead center to retract the awl from the hole and into a position wherein the awl provides an abutment against which plastic may be injected to form a fastener. The plastic injecting mechanism, normally retracted downwardly beneath each operating station, comprises a nozzle maintained at relatively high temperature and a cylinder for liquifying and feeding plastic rod fed thereto, the nozzle and cylinder being movable (lengthwise in the case of the toe unit, widthwise in the case of the side units) in unison with corresponding movements of the adjacent lasting wipers. Additional novel features are to be recognized in, though not limited to, the means hereinafter described for feeding the plastic rod, for bringing the nozzle into contact with the sole just prior to the time when the awl forms the hole for receiving the molten plastic, and for automatically replenishing the supply of molten plastic in the cylinder.

The illustrated machine is constructed and arranged to operate on both two-sole and three-sole stitchdown shoes. Two-sole shoes are prepared for the operation of the machine shown herein by mounting on the sole face of a last an insole having a marginal portion extending beyond the edge of the last bottom and assembling the shoe upper parts upon the last and fastening them in assembled position at the heel end of the last. Three sole stitchdown shoes are prepared for operation of the illustrated machine by attaching to the bottom face of a last an insole of last bottom shape, assembling the shoe upper parts upon the last and fastening them to the heel end of the last, lasting the lining including the doubler and box toe, if any, inwardly over the insole, then removing the fastenings attaching the insole to the last, and mounting on the insole an extension sole or midsole having a marginal portion extending beyond the edge face of the insole. In this latter case the outer portion only of the upper is left free to be tensioned over the last by the illustrated machine and fastened to the outwardly extending margin of the midsole.

The above and other objects and features of the invention, together with various novel details of construction and combinations of parts, will now be described with more particularity in connection with the preferred embodiment of the invention shown in the accompanying drawings, in which:

FIG. 3 is an enlarged view in elevation of the toe operating unit shown in FIG. 2, at rest, and mounted in the machine shown in FIGS. 1 and 2;

FIG. 3a is a section taken on the line IIIa—IIIa of FIG. 3;

FIG. 4 is a view in section substantially on line IV—IV of FIG. 3 and looking in the direction of the arrows;

FIG. 5 is a view corresponding to FIG. 3 and to a larger scale, certain main operating parts being in vertical section and in shoe engaging position;

FIG. 6 is a perspective view of parts shown in FIG. 5;

FIG. 7 is a view in side elevation of parts shown in FIG. 2 for shifting the toe operating unit lengthwise of the shoe;

FIG. 8 is a view corresponding to FIG. 5, the parts being in operative position;

FIG. 9 is a longitudinal section of gripper mechanism shown in FIGS. 5 and 8;

FIG. 10 is a plan view of the mechanism shown in FIG. 9;

FIG. 16 is a horizontal section showing the cam shafts of the machine and their driving relation;

FIG. 17 is a view in side elevation of means for operating an injection device;

FIG. 18 is a longitudinal section of a rod feed supply cylinder shown in FIGS. 3 and 5;

FIG. 19 is a perspective view of a one-way feeding element shown in FIG. 18;

FIG. 20 is a plan view of a modified injector nozzle and shoe rest;

FIG. 21 is a detail view in elevation of the part shown in FIG. 20 and looking in the direction of arrows there shown;

FIG. 22 is a vertical section indicating means for operating the rod feed cylinder;

FIG. 23 is a view in elevation and partly in section of an injection cylinder and its associated valve mechanism;

FIG. 24 is a longitudinal section of the valve shown in FIG. 23;

FIG. 26 is a vertical section of means for operating an awl shown in FIG. 3;

FIG. 27 is a view in elevation and partly in section, of means for operating the valve shown in FIGS. 23 and 24;

FIGS. 28–31 are diagrammatic views showing plastic feeding elements in sequential arrangement;

FIG. 32 is a front elevation of means associated with the left-hand operating unit for positioning the side operating units widthwise;

FIG. 33 is a section taken on the line XXXIII—XXXIII in FIG. 32;

FIG. 34 is a vertical section on an enlarged scale of parts in position to operate on the toe end of a shoe after completion of the wiping operation;

FIG. 35 is a view corresponding to FIG. 34, but showing parts at a subsequent stage of operation;

FIG. 36 is a detail view corresponding to a portion of FIG. 35 and showing parts at a still later stage of operation;

FIG. 37 is a view corresponding to FIG. 35 and showing the relative position of parts when a fastener has been inserted;

FIG. 38 is a vertical section showing the pulled-over toe end with the inserted fastener; and FIG. 39 is a timing chart of the machine.

Figure 1:
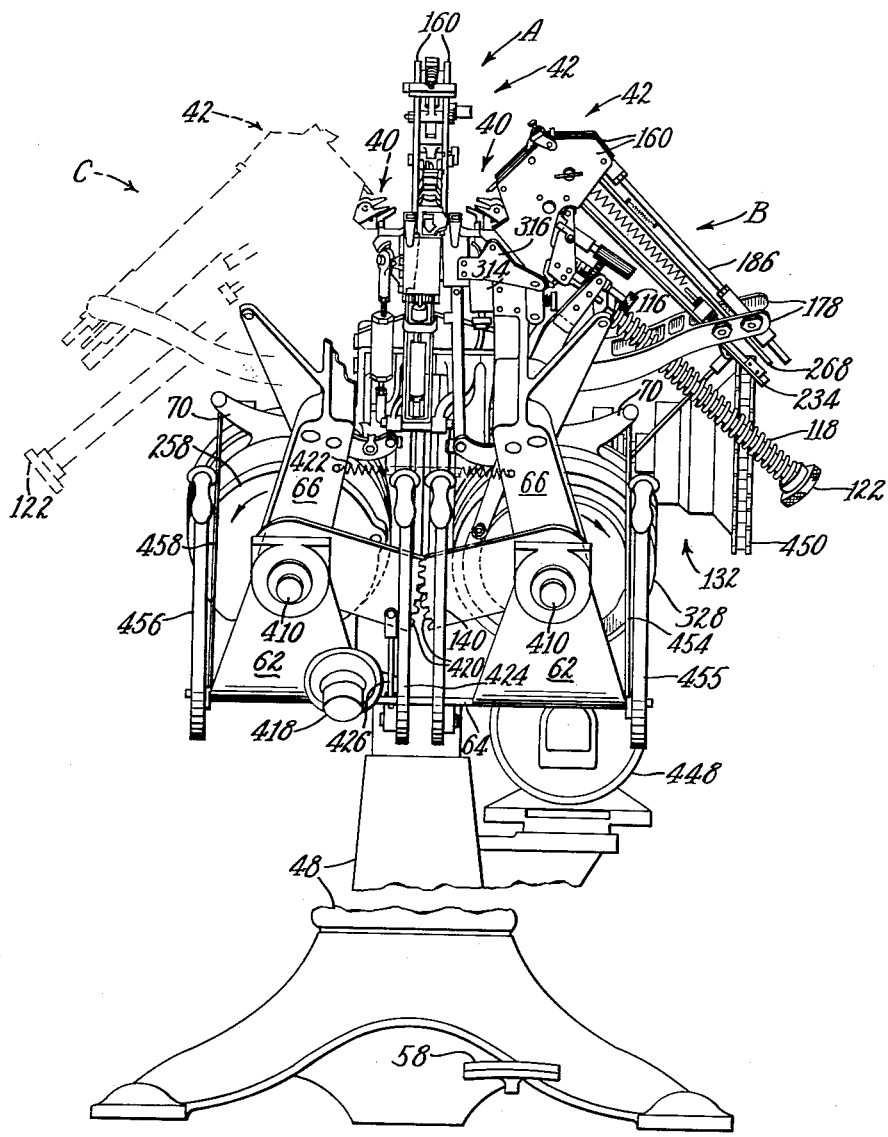
FIG. 1 is a view in front elevation of a machine embodying the features of this invention, a left-hand operating unit being shown in phantom only since it is essentially similar to the right-hand operating unit shown.

Since in the illustrative machine each of the three operating units referred to above are essentially alike in construction and operation, only one of them (the unit at the toe end) will hereinafter be described in complete detail, corresponding parts bearing like reference characters in the drawings. Of the three units a toe operating assembly is for convenience generally designated A (FIGS. 1, 2 and 3), a right-hand operating assembly is designated B (FIGS. 1 and 2), and a left-hand unit is designated C (FIG. 1).

Figure 2:
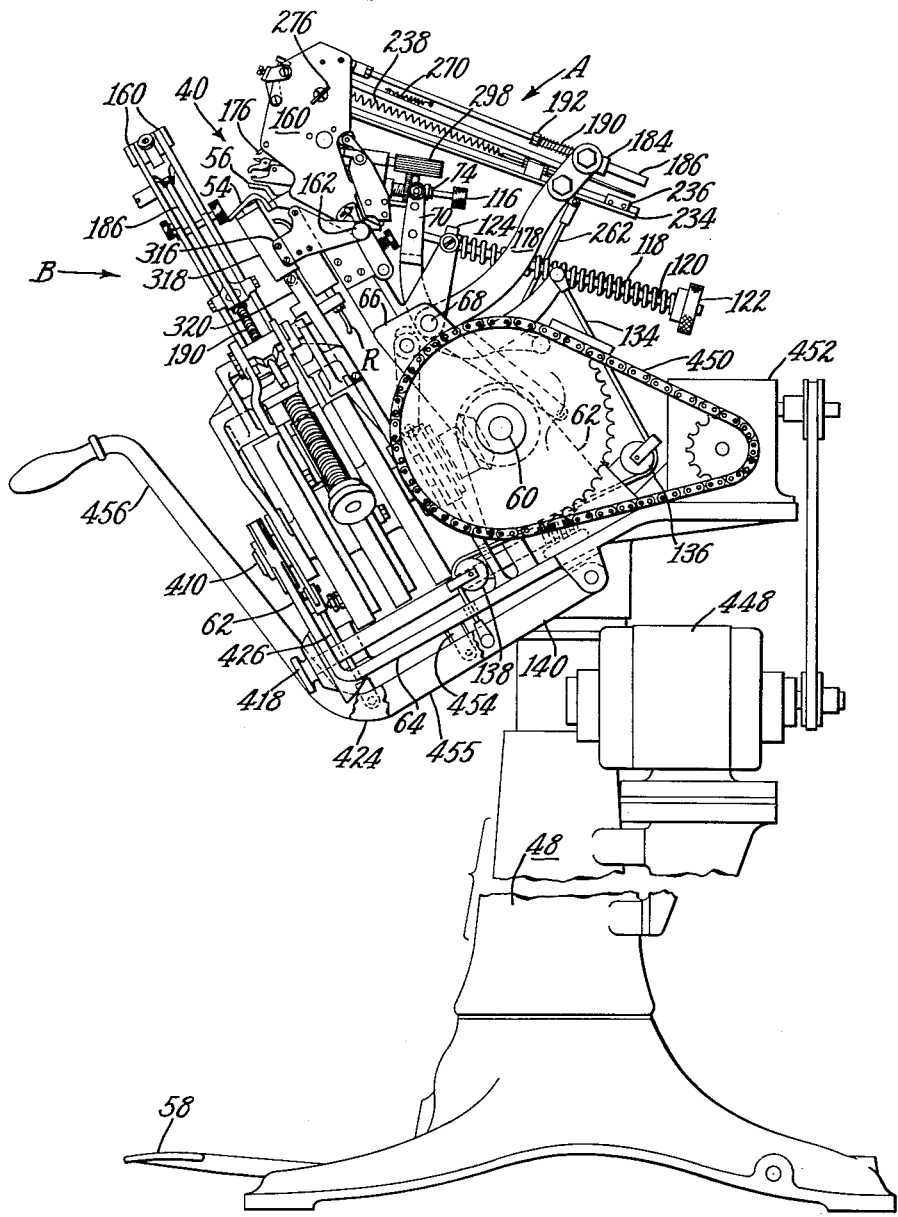
FIG. 2 is a view of the machine in side elevation, an intermediate portion of the supporting frame being broken away.

The toe operating assembly A comprises gripper mechanism 40 (FIGS. 3 and 8 to 15) for pulling an upper U over the toe end of the last L, a wiper and hole forming device 42 for wiping the upper heightwise of a shoe SH (FIGS. 11 and 13) and into the angle between the last and a sole S thereon and for then making a hole in the wiped upper and sole for the reception of fastener means, a plastic rod feeding means 44 (FIGS. 18 and 22), and a mechanism 46 (FIGS. 23 and 34) for melting and injecting plastic into the formed hole to secure the upper to the sole in pulled over relation. These elements of the three operating units, together with their operating means, are arranged in general U formation as indicated by FIGS. 1, 2 and 16, and are mounted on an upright, hollow frame 48. An injector nozzle 50 (FIGS. 3 and 8) of each mechanism 46 is formed with an inclined flat, sole engaging surface 52, projectable into an elongated opening of a stationary shoe rest 54. The three rests 54 are thus spaced and arranged to support the shoe when presented bottom down and inclined upwardly and away from an operator at the front of the machine. To fix the last lengthwise in the machine the toe end is first engaged by the concave end of a last gage 56 (FIGS. 8 and 11 to 15) retractably mounted as subsequently explained. A foot treadle 58 (FIGS. 1 and 2) and its connecting means for initiating successive portions of an operating cycle, as well as manually operable means, later to be described, for initially positioning the units A, B and C with respect to the work and for adjusting an upper widthwise, if desired in an "inspection" dwell in the cycle, are conveniently mounted at the front of the frame.

*Gripper mechanism*

The toe operating assembly A is disposed above its cam shaft 60 (FIGS. 2, 3 and 16) which is arranged widthwise of the machine and journaled in spaced brackets 62, 62 (one shown in FIG. 2) upstanding from an inclined bed plate 64 (FIGS. 1, 2 and 32) secured to the frame 48. A yoke 66 mounted on the shaft 60 as shown in FIG. 3 supports the shoe rest 54 and carries a pin 68 (FIG. 3) on which is pivotally mounted a lever 70 (FIGS. 3 and 25) for operating the gripper mechanism 40. A forked upper end of the lever 70 is secured by trunnion pins 72 to a nut 74 (FIGS. 3, 9 and 10) which threadedly receives a tubular sleeve portion of a pincer pull bar 76. Extending to the left of its sleeve portion, the bar 76 is formed with parallel spaced sides disposed within and contiguous to the parallel, spaced sides of an upper jaw-operating slide 78. This slide carries a pair of rolls 80, 82 (FIG. 9) for operating a movable jaw 84 closable on a lower fixed jaw 86, and is formed with a guide slot 88 for receiving a cross piece 90 screwed to a gripper cover plate 92 with which the fixed jaw 86 is, in effect, integral. As shown in FIG. 9, the jaw 84 is pivoted to the fixed jaw 86 at 87 and is initially locked in open position by means of a lever 94 pivoted to the slide 78 at 96, a tongue 98 of the lever bearing on one end of a spring-pressed releasing plunger 100 mounted on the jaw 84, and the lever 94 then being held in locking position by a latch 102 pivoted at 101 to the pincer pull bar 76. For this purpose a spring plunger 104 in the latch 102 and abutting a cross brace 106 of the pincer pull bar 76 is then urging the lever 94 to maintain its latching position. Upon moving the lever 94 clockwise as viewed in FIGS. 9, 13 and 14, by means later explained, the latch 102 is separated from a complemental web 107 in the slide 78 and the jaws may be closed. A preloaded compression spring 108 on a pilot pin 110 anchored in the cross piece 90 bears endwise against the latter and against a shoulder formed on a tubular sleeve 112 coaxially receiving the reduced end of a pincer grip adjusting screw 114 threaded into the jaw operating slide 78 and slidable axially in the bore of the pincer pull bar 76. In their initially open condition the jaws 84, 86 cannot be closed by the spring 108 since the slide 78 is then prevented by the pincer pull bar 76 from being moved to the right (in FIG. 9), and the lower jaw 86 cannot be forced to the left since the jaw 84 carried there by is not then permitted by the roll 82 to turn counterclockwise. Accordingly, only when the lever 70 is allowed to pivot clockwise on the pin 68, as viewed in FIG. 25 and later explained, is the spring 108 effective to displace the slide 78 to the right (as viewed in FIG. 9) relatively to the fixed jaw 86 and hence close the jaws to seize the upper stock. Turning of a knurled knob 116 on an end of the screw 114 enables the compression of the spring 108 to be modified and hence permits adjustment of the normal gripping pressure of the jaws as appropriate to the nature and thickness of the stock.

Figure 11:
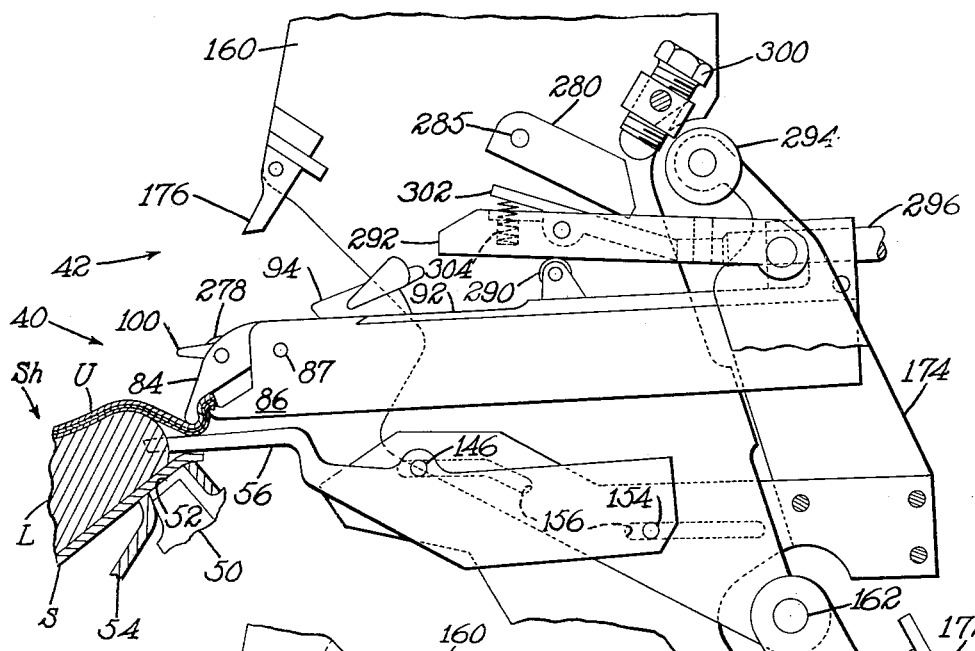
FIG. 11 is a view in side elevation, corresponding to FIGS. 5 and 10, the grippers having tensioned upper stock.
Figure 12:
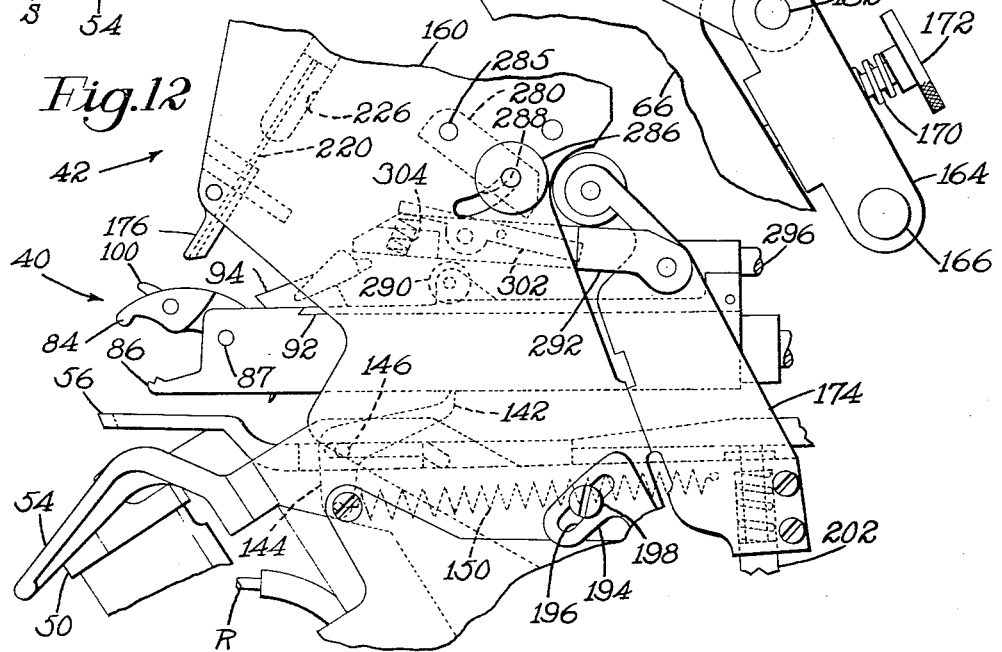
FIG. 12 is a view corresponding to FIGS. 5, 8 and 11, the parts being in rest position.
Figure 25:
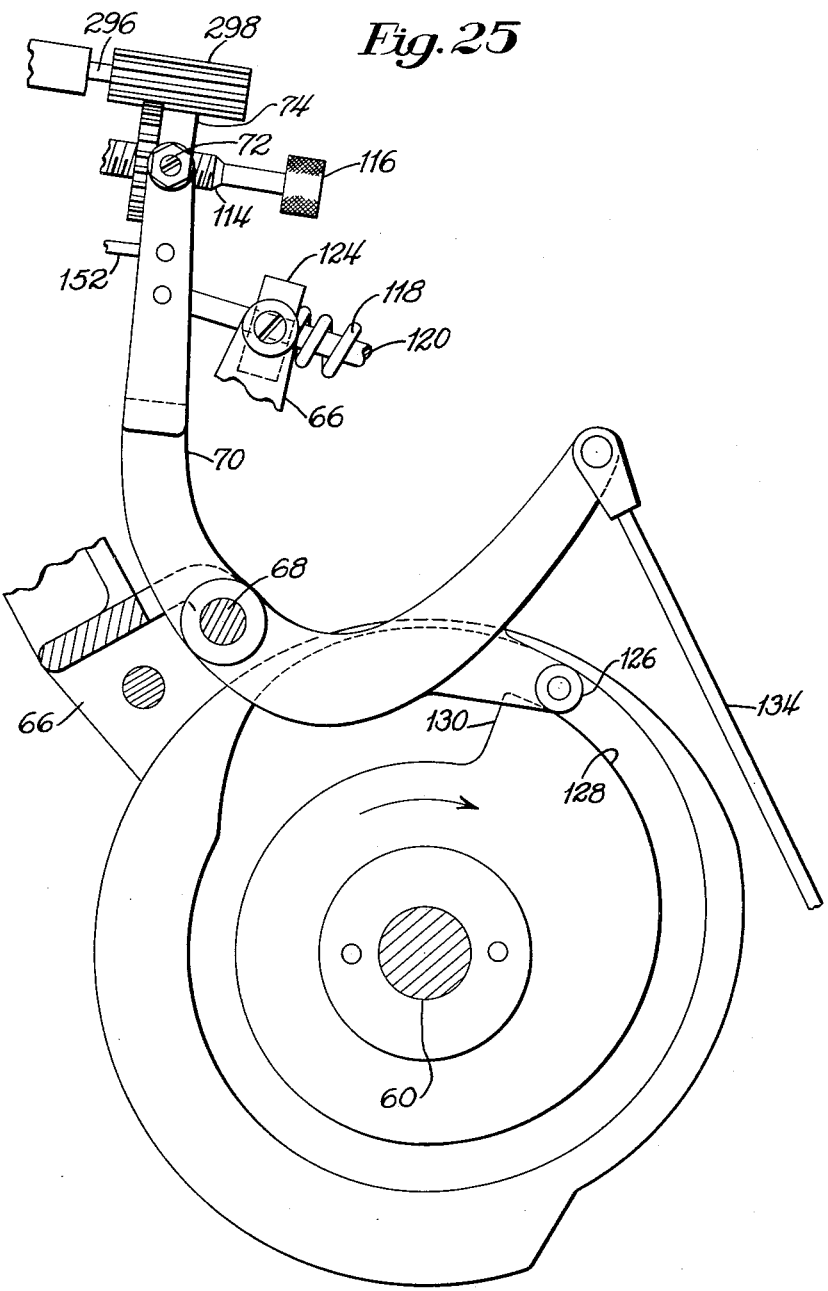
FIG. 25 is a view in elevation of means for operating gripper and wiper mechanism.

The gripper mechanism 40 is normally urged away from a shoe in the machine to tension the margin of the upper by means of a compression spring 118 (FIGS. 2, 3 and 25) on a rod 120 secured at one end to the lever 70. For this purpose one end of the spring 118 abuts a nut 122 (FIG. 2) threaded on the rod 120 and the other end of the spring 118 abuts a cross piece 124 affixed between upwardly extending portions of the yoke 66, the rod 120 slidably extending through the cross piece 124. The spring 118 also serves to maintain a cam roll 126 (FIGS. 3 and 25) against its controlling cam 128. It will be noted in FIG. 25 that the cam track, of which the cam 128 constitutes the inner wall, is considerably widened in the portion following an abrupt jaw-closing slope 130, retraction by the spring 118 of the pull bar 76 acting to retract the latch 102 and hence move the roll-carrying slide 78 to the right in FIG. 9 relatively to the jaw 86 thus to close the jaw 84. It is at this early portion of a cycle, between an initial and a second depression of the treadle 58, which is connected to a conventional clutch generally designated 132 (FIGS. 1 and 16) controlling rotation of the cam shaft 60, that the machine comes to rest and the gripper mechanism 40 may be manually shifted bodily initially to tension the stock over the sole extension and heightwise of the last as shown in FIG. 11 by means of a cable 134 (FIGS. 2, 3 and 25). For this purpose the cable 134 runs over pulleys 136, 138 (FIG. 2) on the frame operatively to connect a rearward end of the lever 70 with a central hand control lever 140 (FIGS. 1 and 2), pivoted to the bed plate 64.

The gripper mechanism 40 is bodily movable lengthwise of the shoe for cooperation with adjacent instrumentalities to be described, the casing comprising the fixed jaw 86 and the cover plate 92 normally being yieldably supported heightwise at its forward portion by an arm 142 (FIGS. 3, 5, 8 and 12) of a lever 144 pivotally carried by a pin 146 fixed in the gage 56, the upper end of the arm 142 being urged slidably to engage the underside of the jaw 86 by a tension spring 150 connecting the lower end of the lever 144 to a rearward portion of the shoe rest 54. For ultimately returning the gage 56 forwardly to its initial last engaging position against the influence of the spring 150, a pusher lever 152 (FIGS. 3, 5, 8 and 12) pivotally secured at one end to the lever 70 has its other end arranged to abut an end of the gage 56, and the lever 152 is subsequently displaced from such engagement by means later explained. For guiding the retractive movement of the gage 56 and the lever 144, the pin 146 and a pin 154 (FIGS. 8 and 13) in the gage are respectively slidable in slots 156 formed in the shoe rest 54.

*Upper wiping and hole forming means*

The wiping and hole forming device 42 (FIGS. 3 and 11 to 15) is mounted for limited swinging movement in a vertical plane and toward and from its operating position. Thus, as shown in FIG. 4, a pair of confronting plates 160, 160 (one shown in FIG. 3), one on each side of the gripper mechanism 40, is supported at their lower ends on a horizontal shaft 162 (FIGS. 3, 5, and 13 to 15) rotatably carried in the upper end of a link 164. The latter is itself pivoted at its lower end to the yoke 66 at the pivot 166. For yieldingly limiting clockwise movement of the shaft 162 with respect to the axis of the pivot 166 and positively limiting the extent of its counterclockwise movement, as seen in FIG. 5, a stud 167 is threaded into the yoke 66 and extends slidably through a washer 168 seated against a shoulder formed in the link 164, the washer normally being held against the shoulder by one end of a compression spring 170 the other end of which engages a knurled adjusting head 172 of the stud. For limiting clockwise movement of the plates 160 respectively a pair of fixed stop plates 174, 174 is secured to the rearward end of the shoe rest 54 and arranged for edgewise engagement with the plates 160, respectively, when a wiper 176 (FIGS. 2, 3, 34 and 35) secured thereto is retracted from the shoe by operating means next to be described.

Referring to FIGS. 3 and 26, for operating the device 42 a forked bell crank lever 178 is fulcrumed on the pin 68 and carries at its lower end a roll 180 arranged to run in a closed cam track 182 (FIGS. 16 and 26). The upper end of the forked lever 178 carries a tubular slide 184 (FIG. 3) for telescopically receiving one end of a rod 186 the other end of which is connected by a pin 188 to the plates 160. Counterclockwise movement of the lever 178 as viewed in FIG. 3 thus yieldingly urges the wiper 176 forwardly and downwardly into wiping engagement with the shoe to be pulled over, a compression or take-up spring 190 on the rod 186 being engaged at one end by the slide 184 and at its other end by a nut 192 on the rod 186.

As indicated in FIG. 39, following closure of the jaws 84, 86 and the interval allowed for any manual shifting of the upper, the wiper 176 is swung downwardly and into engagement with the upper, and normally has a slight dwell prior to retraction of the gage 56 to an out-of-the-way position. To effect this retraction the lever 152 is actuated automatically, as will be described. As shown in FIGS. 3 and 4, in order initially suitably to adjust the range of movement of the wiper 176 for a particular lot of shoes to be pulled over, a bracket 194 (FIGS. 3 and 4) is clamped on one end of the shaft 162 and provided with a slot 196 (FIGS. 3 and 12) concentric with the axis of the shaft 162 for receiving a screw 198 threaded into the adjacent plate 160, this screw being tightened to clamp the plate and the bracket in selected angular relation. The shaft 162 is rotated counterclockwise (as viewed in FIGS. 3 and 5) during the downward movement of the wiper by means of the bracket 194, and accordingly a lever 200 (FIGS. 3 and 5) pinned to the shaft is thereby turned counterclockwise, one end of the lever thus forcing upwardly a spring pressed plunger 202 mounted in the shoe rest 54 and arranged to project therefrom to displace the pusher lever 152 heightwise from abutting relation with the gage 56. The lever 200 has its other end bored to receive a stud 204 adjustably carrying a nut 206 and a lock nut 208 (FIGS. 5 and 8). The 206 is urged into engagement with the lever 200 by a return spring 210 connecting a lever 212, pivotal on the shoe rest 54 and from which the stud 204 is suspended, to the shoe rest 54. Accordingly, the counterclockwise turning (as viewed in FIG. 8) of the shaft 162 and of the lever 200 in the course of downwipe depresses the stud 204 by means of the lever bearing downwardly on the adjustable nut 206. The stud 204 consequently pulls the lever 212 counterclockwise (as viewed in FIG. 8) about its pivot until an angular latching shoulder formed on the front end of this lever is freed from its initial holding engagement with the lower right-hand corner portion of the gage 56. Thereupon, under the influence of the tension spring 150, the gage 56 is retracted to an out-of-the-way position and to the right as shown in FIG. 5.

The wiper 176 is bored to receive an awl 220 (FIGS.

3, 12, 34, 35 and 37) for making a hole for receiving plastic in the wiped upper and sole extension, the awl being operated in timed relation to the wiper and the plastic injection mechanism 46 by means now to be explained. It will be understood, incidentally, that although the illustrative construction discloses means for making but one drilled hole at a time for the reception of plastic which thus is to constitute a fastener in the form of a rivet, it is within the scope of this invention to modify the hole making tool to provide one or more additional drilled holes at a time to prepare the stock for the reception of plastic in other fastener forms such as that of staples, two nozzle outlets then being provided as shown in FIGS. 20 and 21. The thickened upper end of the awl 220 is secured to a slide 222 (FIG. 34) carrying guide rolls 224, 224, reciprocable in a guideway 226 (FIGS. 3 and 12) formed between the plates 160. The slide 222 is pivotally connected to the lower one of a pair of toggle levers 228, 230, the upper end of the latter being pivotally supported by pin 232 (FIG. 3) journaled in the plates 160. For operating the awl, the toggle levers have their knee joint connected to one end of a rod 234 T-shaped in cross section and slidable endwise in ways formed in the confronting faces of the wiper operating lever 178 and an interconnecting portion integral therewith. The latter portion also serves, in the course of clockwise rotation of the lever 178, to engage a block 236 affixed on the rod 234 and thus moves it to the right (as shown in FIG. 3) to load and tension a spring 238 which, when effectively released by means to be explained, actuates the toggle. For this purpose one end of the spring 238 is connected to a stud 240 threaded into a block 242 secured to the rod 234; the other end of the spring is anchored on a screw 244 threaded through the plates 160, 160. A member 246 bridging these plates is supported by the screw 244 and threadedly receives a stop screw 248 an end of which is disposed adjustably to limit travel of the toggle joint beyond straightened condition. To retain the spring 238 in loaded condition, when the block 236 has been shifted sufficiently to the right in FIG. 3 by operation of the cam 182, a bell crank lever 250 is pivotally mounted on the pin 188 and has an upper arm formed with a shoulder 252 arranged to latch with a shoulder 254 formed in the upper end of the toggle lever 230. For releasing the awl operating toggle to the influence of the spring 238 at the proper instant in a cycle, a pin 256 (FIGS. 3 and 27) in a cam blank 258 provided for purposes later mentioned is disposed to engage the cam-shaped end of a lever 260, the other end of which is carried by the pin 68. As a consequence of this engagement a link 262 connected to the lever 260 is moved upwardly to turn a bell crank lever 264 counterclockwise as viewed in FIG. 3, about its pivot 266 in the lever 178, and hence shifts to the left a latch operating link 268 connecting the upper arm of the lever 264 to the lower arm of the lever 250, thereby lifting the shoulder 252 from latching relation with the toggle lever 230. Subsequently to return the lever 250 to position for again latching the toggle in its initial spring loaded condition, a tension spring 270 (FIG. 3) has one end secured to the wiper operating rod 186 and its other end is connected to the link 268. As a safety measure when adjusting the machine it is preferred to insure that the toggle 228—230 will be retained in its latched condition by releasing a cross pin 272 in a spring pressed plunger 274 in one of the plate 160. The inner end of the plunger then bars straightening of the toggle 228, 230, but upon retracting the pin 272 from its seat in a slot 276 (FIGS. 3, 3a) formed in a protruding hub portion of the plate 160 and turning the pin less than 180° the plunger is held in its normal inoperative position.

Figure 13:
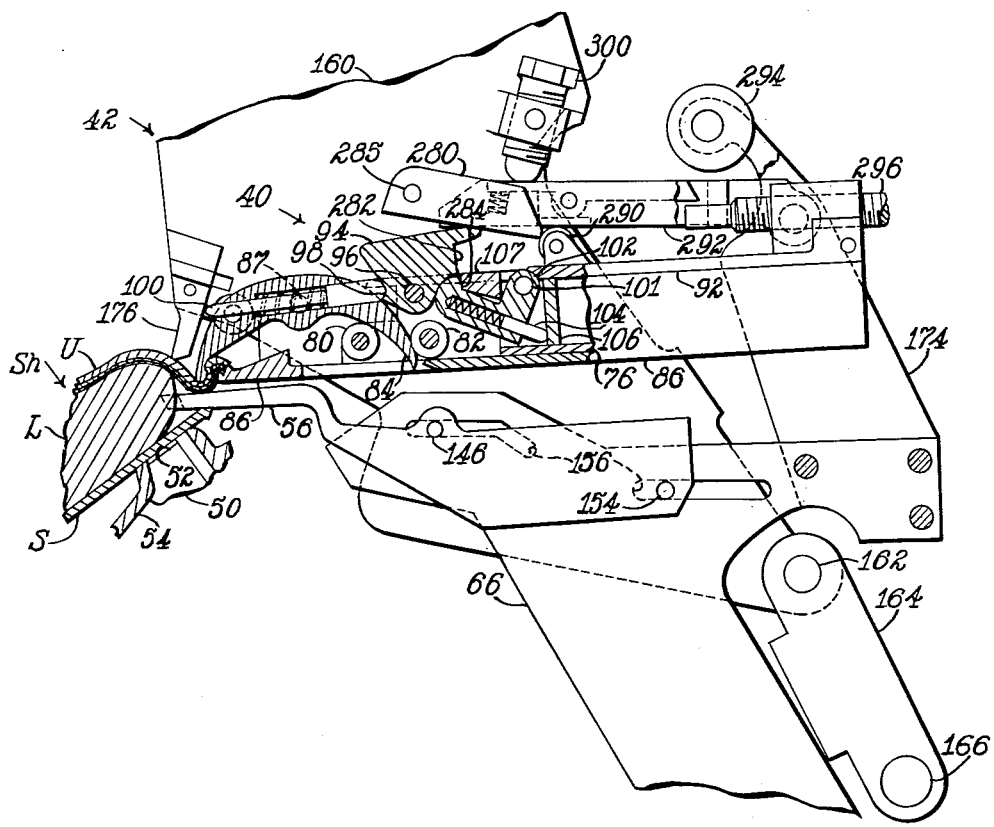
FIG. 13 is a view corresponding to FIG. 5 and partly in section to illustrate operation of gripper mechanism.
Figure 14:
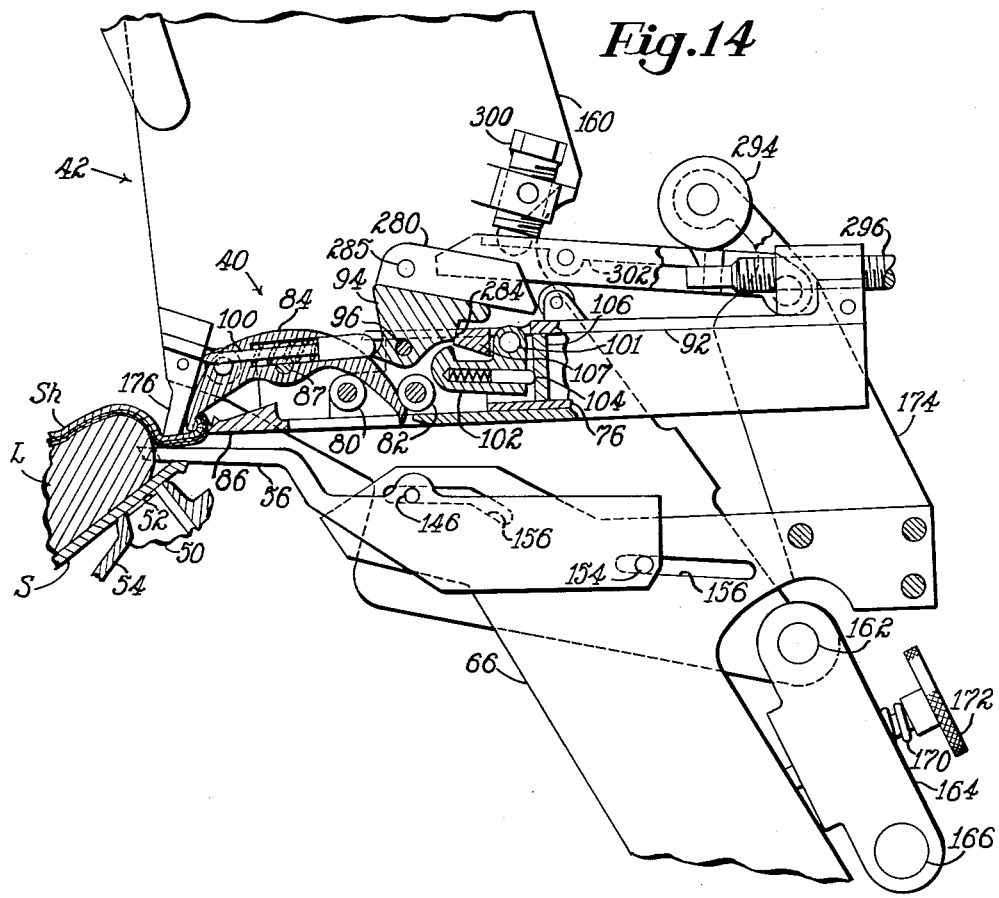
FIG. 14 is a view corresponding to FIG. 13, the parts being shown at a subsequent stage of operation.

In operating the gripper mechanism 40 and wiper-hole-forming device 42, the upper stock is first held gripped and tensioned by the gripper mechanism which is then permitted bodily to advance toward the shoe bottom as stress is exerted upon the upper by operation of the wiper 176. If, however, the lasting margin of the upper be somewhat scant, it is desirable to permit the grippers gradually to release the tensioned stock, and accordingly, means now to be explained is provided whereby the operation of the wiping device 42 automatically reduces the gripping force of the gripper jaws 84, 86. FIGS. 3, 8, 9 and 12 show the parts in starting or rest position, the jaws being open for the reception of marginal stock. FIGS. 11, 13, 14 and 15 indicate the mechanical sequence of stock tensioning and wiping action which follows. The stock having been initially gripped as shown in FIG. 11, and manually shifted if necessary on its last, the device 42 is swung counterclockwise by the cam 182 to the shoe engaging position shown in FIG. 13. At this stage the wiper 176 (which may have engaged anti-friction rollers 278, 278 (FIG. 10) in the jaw 84) has engaged the plunger 100 and depressed it endwise against the lever 94 above the tongue 98 thereby urging the lever clockwise as seen in FIG. 13 about its pivot 96. As a consequence the latch 102 is released from effective pulling relation with the web 107 and the bite of the jaws 84, 86 is at once sufficiently relaxed to permit of a frictional grip which allows the margin of the upper gradually to slip to its relative position shown in FIG. 14 while tension is maintained. Comparing FIG. 13 with FIG. 14, it will be observed in the latter that the counterclockwise movement of the device 42 also lowers a locking arm 280 on one of the plates 160 into abutting relation with the upper surface of the lever 94 and holds a face 282 of the lever 94 for an interval in engagement with a face 284 of the web 107 to prevent any appreciable jaw opening movement to the left of the bar 78 (FIG. 9) under the urging of the spring 108. The arm 280 is pivotally connected to the plate 160 at pin 285 but is normally held in selected angular position by a clamping screw 286 (FIG. 12) threaded therein and extending through a slot 288 concentric with the pin 285.

Figure 15:
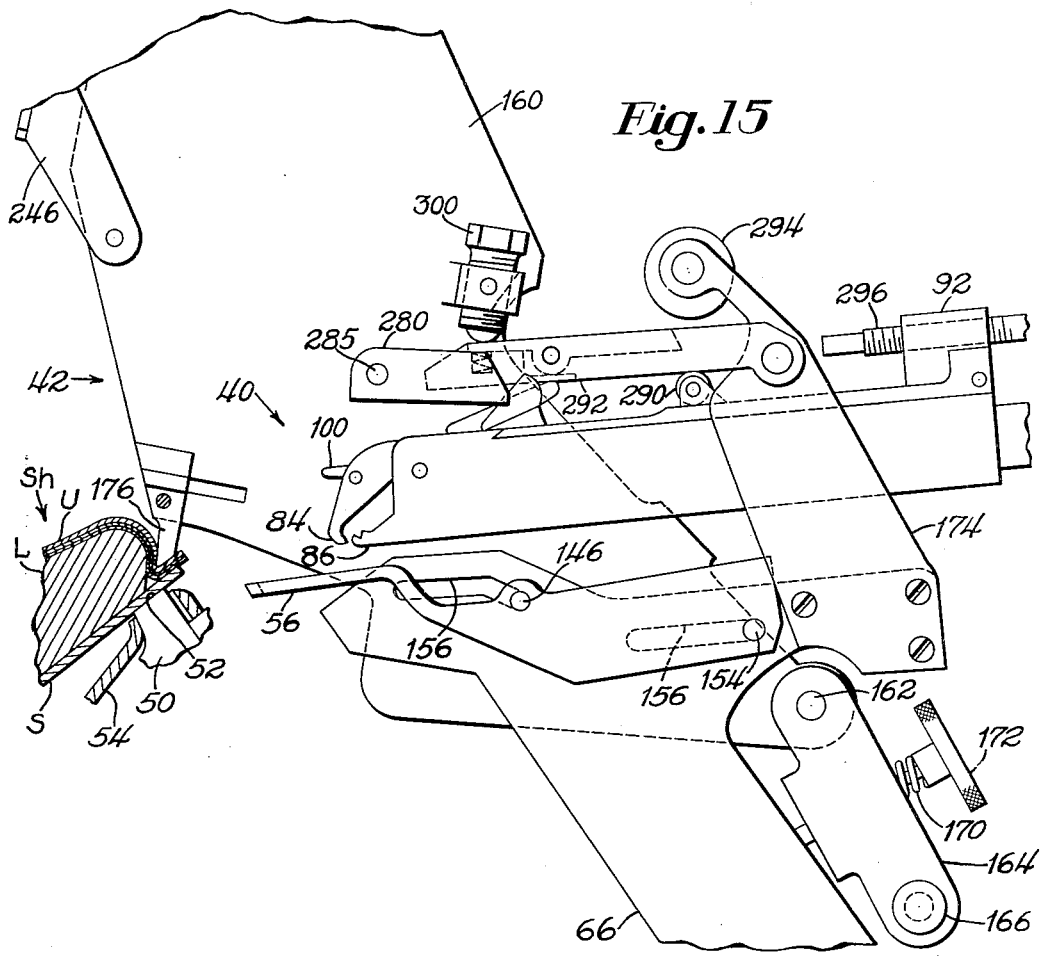
FIG. 15 is a view corresponding to FIGS. 13 and 14 but at a still later stage of operation.

The upper limit of heightwise movement of the front end of the gripper mechanism 40 is controlled by engagement of a roll 290 journaled in upstanding ears of the cover plate 92 with the under side of a lever 292 (FIGS. 3, 6 and 11-15) fulcrumed at its rearward end in the stop plates 174. The maximum heightwise position of the lever 292 is determined by a pair of rolls 294, 294 (FIG. 6) carried by the plates 174. For appropriate initial positioning of the jaws 84, 86 according to the width of upper margins and/or size of shoes, a pincer stop screw 296 is threadedly received in a bore formed in the cover plate 92 and has an enlarged portion 298 formed with splines for meshing with teeth peripherally formed on the nut 74. This arrangement is such that, when the pincer pull bar 76 is caused by the nut 74 to move forwardly to reopen the jaw 84 at the end of a cycle, the nut may slide ineffectively on the splines without causing the fixed jaw 86 to move forwardly. Also, adjustment of the jaws 84, 86 toward or from a shoe by appropriate turning of the portion 298 by hand can, by reason of the meshing of the nut 74 with the portion 298 and with the pull bar 76, be effected without changing compression in the spring 108 or thus altering the gripping pressure of the jaws. To enable the wiper 176 to continue to descend yieldingly, following the contour of the last, while wiping the tensioned upper toward and then into the angle between the last and the sole (as indicated in FIG. 15), the wiper-awl forming device 42 may also pivot counterclockwise about the work-engaging end of the wiper itself upon compression of the spring 170 as the link 164 pivots clockwise on the pin 166. It will be understood that the gage 56 is retracted as above described to enable the wiper to complete its movement into marginal clamping and awl operating position (FIGS. 15 and 34). In order to insure that the gripper mechanism 40 exerts a sufficiently downward direction of tensioning, at least until the wiper 176 engages the upper, a stud 300 is adjustably threaded into one of the plates 160 and arranged to engage the forward end of a lever 302 (FIGS. 5 and 11–15) pivotally carried by the lever 292. The forward end of the lever 302 is depressible by the stud 300 against the resistance of a compression or shock-absorbing spring 304 (FIG. 12) seated in the lever 292 yieldingly to force the jaws toward the last gage 56 until it and they are retracted to their positions shown in FIG. 15.

*Plastic rod feeding, melting and injecting means*

For supplying plastic in rod form R to the melting and injecting mechanism 46 (FIGS. 3 and 23) of the unit A, the rod feeding means generally designated 44 (FIGS. 18 and 22) is provided. For intermittently advancing the rod from a suitable source of supply such as a reel (not shown), the rod is threaded upwardly in an axial bore of a plunger 310 (FIG. 18) slidable in a sleeve 312 extending axially within a housing 314 (FIGS. 3, 5 and 18). This housing is movable heightwise along with the mechanism 46 at the proper plastic injecting time in a cycle, both being secured to confronting levers 316 (FIGS. 3, 4 and 5) pivotally carried on the shaft 162. For this purpose a casing 318 (FIGS. 3, 17 and 23) of the mechanism 46, on which the nozzle 50 is secured, has a lower end coupled by a forked link 320 (FIG. 17) to one arm of a bell-crank lever 322 journaled in the yoke 66. The other arm of the lever 322 carries a roll 324 arranged to ride in a closed cam 326 (FIGS. 16 and 17) of a cam blank 328 mounted on the cam shaft 60. Thus, since the casing 318 and its nozzle 50 are, for plastic melting purposes, kept at a rather high temperature by a heating unit 330 (FIG. 23), the nozzle sole engaging surface 52 is brought only briefly into contact with the work to avoid damage thereto while the fluid plastic is injected as will be explained. Preferably, in order to prevent other portions of the machine from becoming unduly heated, the levers 316 are provided with insulation washers 332 (FIG. 4), and upwardly extending arms of the levers respectively carry insulation guide pads 334 (FIG. 5) for frictional engagement with the plates 160, respectively.

Reverting primarily to FIGS. 18 and 22, the rod receiving plunger 310 is reciprocable axially by means now to be described. A tubular cylinder 336 (FIGS. 22 and 23) has clamped thereon an arm 338 (FIGS. 18 and 22) secured to the plunger 310. The cylinder 336 telescopically receives a plunger 340, their relative axial movement being limited by a pin and slot connection and normally being urged apart by a safety or a compression spring 342 (FIG. 22). Accordingly, for operating a rod severing plunger 344 (FIGS. 23 and 28–31) in a vertical bore in the casing 318 and connected to the upper end of the cylinder 336, and for simultaneously moving the feed plunger 310, the lower end of the plunger 340 is connected to one arm of a lever 346 (FIG. 22) pivoted to the yoke 66, the other arm of this lever carrying a roll 348 disposed in a closed cam 350 (FIGS. 16 and 22) formed in the blank 328. As the feeding plunger 310 is thus moved downwardly, as seen in FIG. 18, an enlarged flange 352 thereon depresses a sleeve 354 on the sleeve 312 against the resistance of a return spring 356 normally urging these sleeves axially apart to the extent permitted by the housing 314. The depression of the sleeve 354 lowers a disk-like feed chuck 358 (FIGS. 18 and 19) carried thereby through a central aperture of which the rod R is threaded. This chuck is shown in FIG. 19 as comprising four resilient segments 360 conically disposed and having their inner edges arranged like teeth to engage the periphery of the rod. It will be understood that these segment edges freely slide downwardly over the sides of the rod R while a holding chuck 362 (FIG. 18), essentially a duplicate of the chuck 358 and mounted in the exit end of the housing 314, confined to limited heightwise movement, prevents more than a small amount of retraction of the rod R, but that upon return or spring actuated movement of the sleeve 354 the upward movement of the segments of the chuck 358 effects a grip on the rod in a toggle fashion to advance it upwardly, the holding chuck 362 now offering no appreciable resistance to feeding. It will be appreciated that a cutting edge 364 (FIGS. 28–31) of the plunger 344 accordingly is effective to sever an end portion of the rod R each time the feeding chuck 358 advances the rod R through a tubular guide 366 in the upper end of the housing 314. As indicated in FIGS. 28–31, the upwardly moving plunger 344 carries the severed piece of rod into a supply of previously melted plastic for reduction by heat. The upstroke is also effective to charge a movable chamber 368 (FIGS. 35 and 36) of predetermined volume in a cylindrical bore 370 formed in the nozzle 50 (FIGS. 20, 21 and 35) with the required amount of plastic for the fastener to be formed. For this purpose the nozzle 50 is secured on the casing 318 so that a port 372 in the base of the nozzle alines with the supply bore of the casing 318 and the retracted or loading position of the chamber 368 (as indicated in FIGS. 23, 34 and 35). As will be noted in FIGS. 28–30 the viscosity of the molten plastic is such that during downward movement of the plunger 344 the plastic does not flow to the inlet for the rod and hence does not escape. Preferably a depression 374 is formed in the side of the plunger 344 with beveled upper and lower ends to allow clearance for any seepage.

The nozzle chamber 368 has one end wall formed by a head 376 of an ejector piston 378 reciprocable in the bore 370 and adapted to remove waste 380 (FIG. 35) caused by operation of the awl 220. The opposite wall of the chamber 368 is provided by the end of a slidable sleeve 382, an opposite end of which is forked to receive trunnion pins 384 (FIGS. 23 and 24) respectively carried in the upper end of a bell crank lever 386. The latter is pivoted at 388 (FIG. 23) on one of the levers 316 and operated by means, next to be explained, for causing relative endwise movement of the piston 378 and the sleeve 382 effective to eject the plastic charge from the chamber 368 and into the work. A lower end of the lever 386 is connected by means of a composite ball-ended link 390 (FIGS. 23 and 27) to one arm of a bell crank 392 (FIG. 27) fulcrumed at 394 to the yoke 66. The other arm of the crank 392 carries a roll 396 received in a closed cam track 398 formed in the blank 258 mounted on the shaft 60. It will be evident that the rise of the cam 398 is thus effective, when a charge of melted plastic has filled the chamber 368 (as shown in FIG. 35), to swing the lever 386 and hence, the sleeve 382 closing the port 372, to move the sleeve 382 along with entrapped plastic in the chamber and the piston 378 in unison, i.e., from their position shown in FIG. 35 to that shown in FIG. 36. Then, the piston head 376 having thus been forced against a stop ring 402 (FIGS. 34–37) near one end of the bore 370 (as shown in FIG. 37) to uncover outlet orifice 404, the operating stroke of the lever 386 is completed, the further final movement of the sleeve 382 to the left (as shown in FIG. 37) forcing the plastic upwardly through the orifice 404, through the awl-made hole in the sole and upper and against the end of the awl 220, the operating toggle of which has reached its stop or beyond dead center position. The wiper 176 preferably has a recessed end portion as shown in FIG. 34 to enable the injected plastic to be formed as a fastener having a retaining barb for securing the formed upper to the sole. In order to enable the piston 378 to be adjusted endwise initially to vary the measured plastic charge in accordance with different fastener requirements, a reduced end portion thereof is threaded into a block 406 (FIGS. 24 and 34) slidably nested in the forked end of the sleeve 382. Accordingly, after palstic fastener injection, return movement of the lever 386 to retract the sleeve 382 to reloading position is also effective to return the block 406 and hence the piston head 376 to its selected loading position.

The units A, B and C having simultaneously pulled over the upper and installed plastic fasteners substantially as just described for the toe unit A, the remainder of a cycle (as noted in FIG. 39) is devoted to the return of operating instrumentalities to their starting positions. With the lowering of the nozzles 50 from the shoe bottom, the shoe may be removed from the machine, the injected plastic rivets having promptly hardened to bind the upper and sole in readiness for the reception of more permanent fastenings if and when desired. It is to be noted that the plastic fastener forming is herein incorporated by way of illustration only and that it is within the scope of this invention to contemplate fastened insertion by other mechanism in combination and/or cooperation with upper wiping means of the general type herein described. The cams controlling side units B and C are secured on cam shafts 410, 410 (FIGS. 1, 2 and 16), respectively, having beveled gear driving connection with the cam shaft 60, as shown in FIG. 16, the order of the cam blanks (and other associated mechanism) being reversed on one shaft 410 as compared with those arranged on the other shaft 410. Means next to be described is provided for bodily shifting the unit A lengthwise relatively to the units B and C, and for shifting the latter bodily widthwise, if necessary, to accommodate different size ranges. Referring to FIG. 7, a segment gear 412 is secured to the yoke 66 and arranged to be rotated on the shaft 60 by a worm 414 formed on a rod 416 having bearings in the bed plate 64. A knob 418 (FIGS. 1, 2, 7 and 16) on the front end of the rod 416 is provided with a scale which may be turned manually relatively to a reference point to shift unit A lengthwise as desired. Now referring primarily to FIGS. 1, 2, 32 and 33, upstanding yokes 66, 66 of the units B and C are respectively connected to meshing gear sectors 420, 420 fulcrumed on the shafts 410, respectively. In order to equalize shifting of the units B and C widthwise, these units normally being urged together by a tension spring 422 (FIG. 1) connecting their yokes 66, a manual adjusting lever 424 (FIG. 1, 2 and 32) pivoted to a rearward portion of the table 64 is connected to one of the sectors 420 by a link 426.

It is desirable at the beginning and end of each cycle of operations that the units B and C assume their selected widthwise positions, but that in the course of each cycle these units be independently yieldable widthwise as required. Accordingly, means is provided for locking sectors 420 in selected widthwise position at the close of each cycle and for releasing them immediately after the start of a cycle. For this purpose a bracket 428 (FIGS. 32 and 33) upstanding from the table 64 is forked slidably to receive a depending arm of the sector 420. The inner portion of the bracket 428 pivotally carries a clamping lever 430 one end of which is formed with confronting cheeks engaging a clamping roller 432 and the other end of which is formed as a cam 434 disposed to be engaged by an operating button 436 adjustably threaded into the cam blank 400. The roller 432, when the button 436 does not bear on the lever (as in the major portion of a cycle) is slidable in a slot 438 in the bracket, a compression spring 440 nested in the bracket bearing on the roller to urge it out of binding relation with a side of the sector 420. As a cycle ends the arrangement is such that the button 436 comes to rest on the lever 430 after causing it to be swung counterclockwise as shown in FIG. 33 to force the roller 432 into clamping contact with the sector 420. The limits of turning movement of the sector 420 of the unit C about the axis of the shaft 410 may be determined by a slot 442 concentric therewith formed in the sector and a clamping bolt 444 extending through the slot and spanning projecting portions of the bracket 428. Preferably a right hand stop stud 446 (FIG. 32) of a pair adjustably threaded into the sector for endwise engagement with the bolt 444 limits the extent to which the spring 422 can urge the units B and C together.

For driving the shaft 60 and 410, 410 in synchronism through the clutch 132, a motor 448 (FIGS. 1 and 2) is mounted on a stand projecting from the frame 48 and continuously drives a chain 450 through suitable reduction gearing 452 (FIG. 2) disposed at the rear of the machine.

The manner of operation of the machine will now be briefly summarized. The operator takes a last having a sole and an upper loosely assembled thereon and presents it with the marginal portion of the forepart of the sole in engagement with the three rests 54, the toe end face of the last engaging the last toe gage 56. The side units B and C being positioned widthwise for last engagement as just described, their side gages 56 serve to position the toe end of the last laterally. While holding the last with one hand in the position in which it is presented the operator inserts the margin of the upper between the three pairs of open jaws 84, 86 and momentarily depresses the treadle 58 to cause closure of the three gripper mechanisms 40 on the upper at the toe end and at each side. As above explained, the consequent few degrees of initial rotation of the shafts 60 and 410, 410 enables the rolls 126 (FIG. 25) to pass over the respective slopes 130 whereupon the pull bars 76 are retracted by the springs 118 and hence, through their latches 102 respectively, the slides 78 are retracted relatively to the jaws 86, respectively, and the jaws 84 are closed to seize and tension the margin of the upper. Having thus caused the upper to be gripped at the toe end, as shown in FIG. 11, and at opposite sides thereof the machine comes to rest thereby affording the operator such time as he requires for relocating, if necessary, the upper with respect to its last. By means of the hand lever 140 (FIG. 1) he further tensions the tensioned upper if need be suitably to position it lengthwise. Similarly, widthwise shifting of the upper is effected in the unit B by a cable 454 (FIG. 1) connecting its lever 70 with a right hand lever 455, and in the unit C by means of a left-hand operating lever 456 (FIGS. 1 and 2), the latter also being pivotally connected at its rearward end to the table 64 and having a cable connection 458 (FIG. 1) to the lever 70 of the unit C.

When fully satisfied as to the position of the shoe in the machine and the relative position of the upper and last, the operator will depress the treadle 58 again to cause the clutch 132 to rotate the shafts 60 and 410, 410 for the balance of one revolution. Thereupon the wipers 176 independently move into engagement with the upper and dwell until the last gages 56 are automatically retracted as above described. In the course of the downward movement of each wiper unit 42 about the fulcra 162 the latter are yieldable away from the shoe to permit the wipers 176 to follow the contours of the last. Also, if the margin is at any point at the toe end or at either side thereof becoming scant as the wiping progresses, the gripper mechanisms 40 may yieldingly move somewhat toward the shot bottom and also, by reason of operation of the plungers 100 by the wiper devices 42, the grip of the jaws 84, 86 may be relaxed to permit the margin to slip therefrom though still be tensioned thereby. The continued effective gripping of the margin is insured by reason of the locking arm 280 forcing the lever 94 into engagement with the face 284 of the web 107.

Upon wiping the upper into the angle between the last and the sole thereon and then holding the margin of the upper and the sole clamped in lasted relation, the awls 220 operate to form plastic receiving holes in the upper and sole as above explained, whereupon the endwise movement of the sleeves 382 relative to the piston heads 376 of the injecting mechanisms 46 operate to inject melted plastic (for instance nylon) into the holes and against the ends of the awls. The latter are positioned heightwise at this stage of the cycle by their operating toggles having passed dead center and engaging adjustable stops 248. For supplying the molten plastic to the nozzle chambers 368, the respective filament-cutting plungers 344 (FIG. 23) are operable by means including the cam 350 (FIG. 22), the filament having been advanced into the heated casing 318 by the feeding chucks 358 respectively (FIG. 18). The check chucks 362 respectively have limited movement in the upper end of the housings 314 to permit each filament to be slightly retracted from the casings 318 after severance, thus preventing premature plastic melting. It will be understood that the plastic rod feeding means 44 are thus organized to feed the filaments into the casings 318 for melting when the plungers 344 are at their limits of downward movement. Injection of the melted plastic to secure the pulled over upper occurs when the nozzle surfaces 52 have been raised into sole engaging positions by the cams 326 (FIGS. 16 and 17).

It will be appreciated from the foregoing that the invention provides a compact organization capable of shaping and securing the toe portions of uppers faithfully over their lasts, and enabling the operator to obtain a good quality of shoemaking with but little effort on his part.

Having thus described my invention, what I claim as new and desire to secure by Letters Patent of the United States is:

1. In a machine for shaping uppers over lasts and having a wiper and a support for a last with an upper and sole assembled thereon, means for moving the wiper height-wise of the last to wipe the upper into the angle between the last and a marginal extension of the sole and then press the margin of the upper and the sole extension against said support, a tool mounted for movement relatively to the wiper for forming a fastener-receiving hole in the sole and margin while they are pressed together, and mechanism operable through the support in timed relation to the tool for inserting fastener material into the hole to secure the sole and margin in pressed together relation.

2. A machine as set forth in claim 1 and further characterized in that said material inserting mechanism comprises a heated nozzle movable into and out of engagement with the sole in the vicinity of the hole, and means for injecting a predetermined volume of molten plastic through the nozzle when it is in effective communication with the fastener receiving hole.

3. A machine as set forth in claim 2 and further characterized in that said injecting means includes a piston reciprocably mounted in the nozzle, a sleeve mounted for joint and relative coaxial movement with respect to the head of the piston, and power means for operating the piston and the sleeve between plastic receiving and delivery positions.

4. In a machine for shaping uppers over lasts, means for supporting a last in bottom down position with an upper and a sole assembled thereon, a plurality of grippers arranged about the toe end to tension the upper heightwise and away from a marginal extension of the sole, a wiper-hole-forming device associated with each of said grippers and arranged to wipe the tensioned upper into the angle between the last and the sole extension, said devices being constructed and arranged to clamp the wiped upper and said extension against said supporting means and then to form fastener receiving holes in the sole and the margin of the upper, and means thereupon operative to thrust fastener material into the plurality of holes thus formed to secure the upper to the sole.

5. In a machine for shaping uppers over lasts, means for supporting a last in bottom down position with an upper and a sole assembled thereon, means for gripping the margin of the upper at the toe end to tension it outwardly over a marginal extension of the sole, a wiper mounted for movement heightwise of the last to wipe the tensioned upper into the angle between the last and the sole extension, an awl, mechanism for operating the awl in timed relation to the wiper to provide a hole in the sole and margin of the upper while they are clamped by the wiper against said last supporting means, a nozzle engageable with the sole in the vicinity of the hole upon removal of the awl therefrom, and mechanism operable during the engagement of the nozzle with the sole to force plastic through the hole for securing the upper and the sole.

6. In a machine for shaping uppers over lasts, means for supporting a last in bottom down position with an upper and a sole assembled thereon, spaced grippers for seizing and tensioning the margin of the upper around the toe end and over a marginal extension of the sole, a plurality of wiping units yieldingly swingable in heightwise planes respectively to wipe the upper around the toe end into the angle between the last and the sole extension, each of the wiper units including members disposed to urge a gripper to direct its tensioning heightwise and then to relax its hold on the upper, power means for operating the wiper units in unison, and mechanism operative through the last supporting means beneath each of the wiper units for securing the wiped over margin to the sole extension.

7. In a machine having means for tensioning an upper over a last and a wiper for wiping the tensioned upper heightwise against a sole on the last, a reciprocable awl projectable beyond the wiper at the end of its operating stroke to form a hole in the sole and the margin of the upper for receiving molten fastener forming material, a heated injector nozzle engageable with the sole, means for causing the nozzle to contact the sole just prior to operation of the awl, and means for injecting the material from the nozzle, into said hole, and against the retracted awl.

8. In a machine having means for tensioning an upper over a last and a wiper for wiping the tensioned upper heightwise against a sole on the last, a support for the last against which the wiper can clamp the sole and the upper, a device for forming a hole in the clamped sole and upper, plastic injection means comprising a heated nozzle engageable with the sole prior to operation of said hole-forming device, relatively movable members for ejecting fluid plastic through the nozzle and into the hole formed by said device, a plastic melting chamber for supplying fluid plastic to said members, and mechanism for feeding plastic in solid form to said chamber to replenish plastic in the chamber in accordance with the delivery rate of said members.

9. In a machine for securing the margin of an upper to a sole extension, a wiper for clamping the upper against said extension after a wiping operation, and means operable in timed relation to the wiper for securing the upper and sole extension in clamped relation, said last-named means including a hole forming device operable from one side of the work, and a thermoplastic injection device operable to fill the hole from the other side of the work.

10. A machine as set forth in claim 9 and further characterized in that said fastener injection device comprises a heated nozzle, a cylindrical bore formed in the nozzle, a pair of relatively movable members arranged in the bore for ejecting fluid plastic under pressure from the nozzle, a casing adjacent to the nozzle and having a melting chamber for supplying molten plastic into said bore between said members, a plunger operable in the chamber for severing solid plastic and for forcing fluid plastic therefrom and into said bore, means intermittently operative to advance a length of plastic in solid form into position to be severed by the plunger, and mechanism for operating the members, said plunger and the plastic advancing means in sequence.

11. A machine for shaping uppers over lasts comprising three lasting units arranged, respectively, to operate at the extreme end of a shoe and at either side of the end of the shoe, each of said units including respectively a last support, a retractable last gage, gripper mechanism for tensioning the upper on a last on the support over a marginal extension of a sole thereon, a wiper-hole-forming device movable heightwise to wipe the upper into the angle formed between the last and the sole extension and then form a hole through the latter and the overlying upper, retraction of said gage being responsive to operation of the wiper device, and means movable through said last support for injecting into said hole fastener-forming plastic to secure the margins of the wiped upper and of the sole together.

12. A machine as set forth in claim 11 and further characterized in that power means is provided for cyclically operating said units simultaneously.

13. A machine for shaping uppers over lasts comprising, means for supporting a last in bottom down position with an upper and a sole thereon, means for gripping the margin of the upper to tension it about an end of the last and over a marginal extension of the sole, a wiper mounted for movement heightwise of the last to wipe the tensioned upper into the angle between the last and the sole extension, and power means thereupon operative to apply under pressure measured amounts of hardenable fluid plastic for holding spaced localities of the extension and margin in secured relation.

References Cited in the file of this patent

UNITED STATES PATENTS

| | | |
|---|---|---|
| 2,152,855 | Ricks et al. | Apr. 4, 1939 |
| 2,524,882 | Choice et al. | Oct. 10, 1950 |

FOREIGN PATENTS

| | | |
|---|---|---|
| 467,669 | Great Britain | June 21, 1937 |